(12) United States Patent
Lentini

(10) Patent No.: US 11,192,060 B2
(45) Date of Patent: Dec. 7, 2021

(54) AIR SEPARATORS AND RELATED METHODS

(71) Applicant: JDL TECH USA LLC, Newton, MA (US)

(72) Inventor: Joseph Lentini, Tustin, CA (US)

(73) Assignee: JDL TECH USA LLC, Newton, MA (US)

( * ) Notice: Subject to any disclaimer, the term of this patent is extended or adjusted under 35 U.S.C. 154(b) by 400 days.

(21) Appl. No.: 16/320,461

(22) PCT Filed: Jul. 19, 2017

(86) PCT No.: PCT/US2017/042773
§ 371 (c)(1),
(2) Date: Jan. 24, 2019

(87) PCT Pub. No.: WO2018/022376
PCT Pub. Date: Feb. 1, 2018

(65) Prior Publication Data
US 2021/0016221 A1    Jan. 21, 2021

Related U.S. Application Data

(60) Provisional application No. 62/366,504, filed on Jul. 25, 2016.

(51) Int. Cl.
*B01D 53/14* (2006.01)
*B01D 53/54* (2006.01)

(52) U.S. Cl.
CPC ......... *B01D 53/14* (2013.01); *B01D 53/1475* (2013.01); *B01D 53/54* (2013.01)

(58) Field of Classification Search
CPC ..... B01D 53/14; B01D 53/1475; B01D 53/54
USPC .......................................................... 95/90
See application file for complete search history.

(56) References Cited

U.S. PATENT DOCUMENTS

| 3,659,399 A | 5/1972 | Kauer, Jr. et al. |
| 4,698,075 A | 10/1987 | Dechene |
| 4,725,293 A * | 2/1988 | Gunderson ........ B01D 53/0454 96/110 |
| 5,074,893 A | 12/1991 | Hursey |
| 5,176,722 A | 1/1993 | Lemcoff et al. |
| 5,505,765 A | 4/1996 | Kaji et al. |
| 5,769,928 A | 6/1998 | Leavitt |
| 2004/0079227 A1* | 4/2004 | Lim ................... B01D 46/0004 95/90 |
| 2004/0141862 A1 | 7/2004 | Cornwell |

(Continued)

FOREIGN PATENT DOCUMENTS

CN         104591095 A  *  5/2015

OTHER PUBLICATIONS

CN-104591095-A English Translation (Year: 2015).*
(Continued)

*Primary Examiner* — Anita Nassiri-Motlagh
(74) *Attorney, Agent, or Firm* — Klein, O'Neill & Singh, LLP

(57) ABSTRACT

A portable gas separator assembly utilizing carbon molecular sieve absorbents or elements to separate a compressed air stream to extract nitrogen and oxygen molecules. Components of the assembly include at least two charging towers so that one tower can be charged with compressed gas while the other of the at least two towers is purged.

5 Claims, 9 Drawing Sheets

(56) References Cited

U.S. PATENT DOCUMENTS

| | | | |
|---|---|---|---|
| 2007/0023039 A1 | 2/2007 | Ishizaki et al. | |
| 2007/0125232 A1* | 6/2007 | Wrosch | B01D 53/22 |
| | | | 96/4 |
| 2007/0220808 A1* | 9/2007 | Kaprielian | A01G 27/003 |
| | | | 47/48.5 |
| 2007/0222112 A1 | 9/2007 | Christ et al. | |
| 2008/0271810 A1 | 11/2008 | Shultz et al. | |
| 2015/0182720 A1* | 7/2015 | Taylor | B01D 53/0438 |
| | | | 128/205.12 |

OTHER PUBLICATIONS

International Search Report and Written Opinion on corresponding PCT application (PCT/US2017/042773) from International Searching Authority (US) dated Sep. 27, 2017.

* cited by examiner

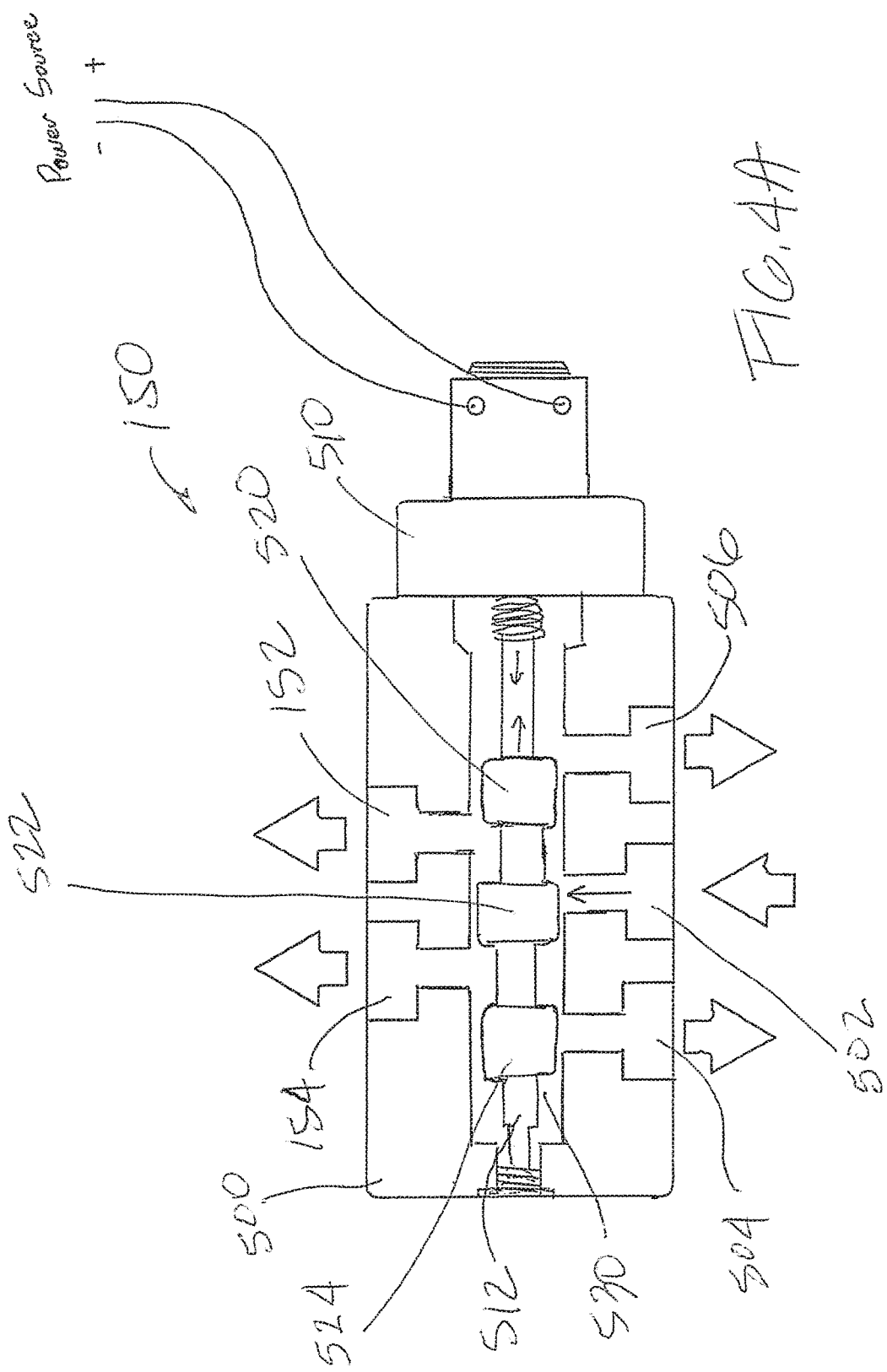

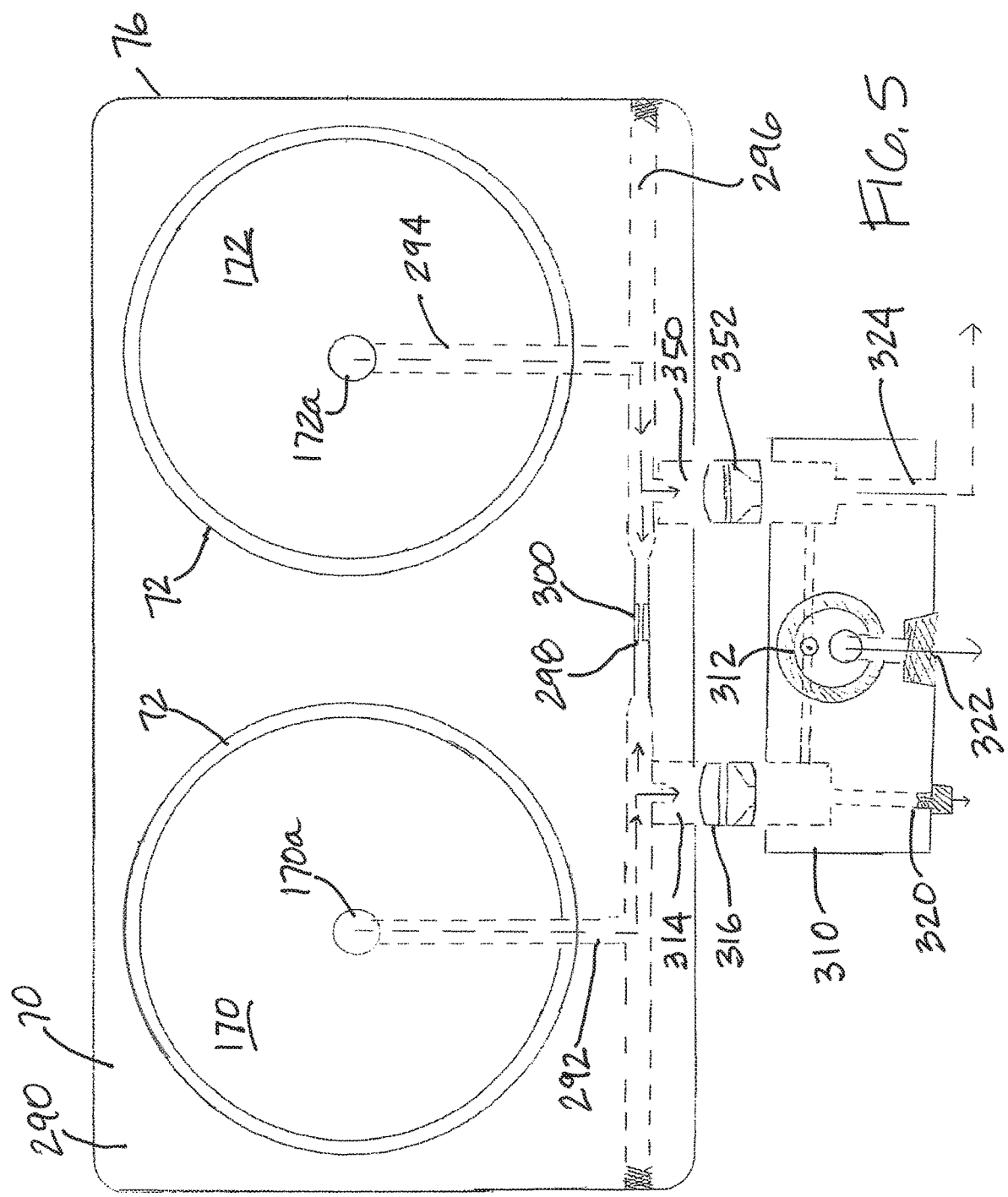

AIR SEPARATORS AND RELATED METHODS

FIELD OF ART

The present disclosure is generally directed to air separators and related methods and more particularly to packaged air separators for separating nitrogen and oxygen molecules and related methods.

BACKGROUND

Air separation is a process that is well known in the art for separating oxygen molecules from nitrogen molecules. Various devices and industries have developed systems, methods, and devices to supply end users with concentrated oxygen and nitrogen molecules.

It is not uncommon for nitrogen plants to produce very high nitrogen and oxygen contents, in the order of 99% and higher purity. However, for a portable gas separator for use in a smaller shop or in the field, the speed in which nitrogen and/or oxygen can be produced and the purity of the produced stream can be challenging.

SUMMARY

Aspects of the present disclosure comprise a portable gas separator assembly for separating contents of the gas stream into two or more streams. One stream can be high concentration of nitrogen molecules and another stream can be high concentration of oxygen molecules.

The stream with high concentration of nitrogen molecules can be 85% or higher and can be stored in a storage tank. The high concentration stream can be used for a number of different applications, including to fill automobile tires.

The separator assembly can be mounted to a portable housing having wheels for maneuverability.

The present disclosure can include a gas separator system comprising a first charging tower comprising a body with an upper end and a lower end defining an interior comprising a bed of carbon molecular sieve elements and a second charging tower comprising a body with an upper end and a lower end defining an interior comprising a bed of carbon molecular sieve elements; the first charging tower and the second charging tower are in constant fluid communication with one another at an outlet manifold for moving gas therebetween during a charging phase and a purging phase; a first manifold comprising a body having two or more ports to direct gas flow connected to a second manifold, said second manifold having a first outlet port connected to an inlet of the first charging tower, a second manifold connected to an inlet of the second charging tower, an inlet port receiving pressurized gas from the first manifold, a first purging port connected to the first outlet port, a second purging port connected to the second outlet port, and a valve stem movable to direct pressurized gas to either the first outlet port or the second outlet; a regulator and control system comprising a manifold, a control valve, a pressure step-down regulator, and at least one of a gas sensor and a moisture sensor to sense contents from the first charging tower and the second charging tower; a storage tank for storing gas discharged from the first charging tower and the second charging tower; and a controller to control a plurality of control valves to direct gas discharged from the first charging tower, the second charging tower, or both to the storage tank only if a gas set point is met.

Portable battery power for powering the controller can be incorporated. The batter can be recharged with utility power.

The separator assembly can include a housing having at least a pair of wheels attached thereto for selectively maneuvering the gas separator system.

An air filter for receiving inlet compressed gas upstream of the first manifold can be incorporated.

At least one kickstand for supporting the housing when not moving can be incorporated.

A lead manifold and an application manifold located downstream of the storage tank can be incorporated.

The application manifold cab be located downstream of the lead manifold.

The application manifold can comprise at least four ports for simultaneously outputting up to four gas consuming components at the same time.

The at least four ports can each be controlled by a control valve.

The gas consuming components can be automobile tires.

The inlet compressed gas to the gas separator can be compressed air or nitrogen from a nitrogen source.

The gas stored in the storage tank can comprise high N2 concentration, of 85% or higher.

The outlet manifold can comprise an orifice separating the first charging tower and the second charging tower.

The orifice can have an opening of between three thousandths of an inch to about twenty thousandths of an inch.

The orifice can have an opening of between three thousandths of an inch to about ten thousandths of an inch.

The first charging tower and the second charging tower can each comprise a screen structure placed over an inlet at a bottom end plate and under the bed of carbon molecular sieve elements.

A second screen structure can be located above the bed of carbon molecular sieve elements.

The bottom end plate can comprise a plurality of flow holes and two or more sub-surface flow channels.

The bed of carbon molecular sieve elements can be packed inside each of the first charging tower and the second charging tower.

The controller can be programmed to read moisture and nitrogen contents from the lead manifold, the application manifold, or both.

A second storage tank can be connected in series or in parallel with the storage tank.

A further aspect of the present disclosure includes a method of manufacturing a gas separator. The method can comprise providing a first charging tower comprising a body with an upper end and a lower end defining an interior; filling the first charging with a bed of carbon molecular sieve elements and packing the bed carbon molecular sieve elements by shaking, vibrating, moving, imparting an impulse, or combinations thereof to the body to produce a first packed bed of carbon molecular sieve elements; performing at least one re-pour step to add carbon molecular sieve elements to the first packed bed of carbon molecular sieve elements to produce a first re-pour bed of carbon molecular sieve elements and packing the first re-pour bed of carbon molecular sieve elements by shaking, vibrating, moving, imparting an impulse, or combinations thereof to the body to produce a second packed bed of carbon molecular sieve elements; providing a second charging tower comprising a body with an upper end and a lower end and a bed of carbon molecular sieve elements; and providing a flow line comprising an orifice and connecting the flow line to a discharge of the first charging tower and a discharge of the second charging tower.

Yet another aspect of the present disclosure is a method of using a gas separator assembly as described elsewhere herein.

The gas separator assembly is configured to receive compressed gas at a gas inlet, process the compressed gas, and provide for at least two different discharge streams at a first outlet and a second outlet. The first outlet can comprise high nitrogen concentration flow, higher than 30%. The second outlet can comprise high nitrogen concentration, higher than 78%.

The first and second outlets can each comprise one or more outlet ports for producing one or more streams. For example, the second outlet can have four regulated discharge ports for outputting to four different tires.

The gas inlet can similarly have multiple ports to receive multiple inlet streams. For example, a first inlet port can be sized and shaped to receive pressurized nitrogen and a second inlet port can be sized and shaped to receive compressed air, such as from an air compressor.

Optionally, multiple manifolds may be used for outputting more than four regulated discharge streams, such as eight, twelve, sixteen or more regulated discharge ports at the first outlet, the second outlet, or both.

In an example, the compressed gas is compressed air and the two outlet streams can comprise a nitrogen stream comprising nitrogen molecules and an oxygen stream comprising oxygen molecules.

The separator assembly can include a housing for housing tanks or vessels, flow lines, which can include tubing sections, fittings, hoses, valves, sensors, electronics, and optional portable power, which can comprise a rechargeable DC battery power for powering the controls in the controller housing, valves, and sensors, among others.

A control panel with a programmable controller can be provided with the housing for controlling operations of the various components, such as switches and converting sensors and/or probe readings to readable values, such as percentage moisture content, percent nitrogen, and pressure reading.

The housing may include one or more housing panels attached to a frame or chassis for covering the various separator assembly components. The frame can be made from a metal material, such as from extruded metal, and the housing panels can be made from thin meal sheets, from plastic, or both.

A pair of wheels can be provided to aid in moving the housing around, such as by tilting the housing and moving the housing about the two wheels.

A pair of kickstands can be provided to support the housing when not in motion.

Alternatively, a pair of swivel casters can be provided with the pair of wheels to enable moving on four wheels.

One or more hooks or hangers can extend outwardly from the housing to provide anchor points for hanging things or items therefrom, such as for hanging hoses, electrical cords or cables, etc.

Pockets and/or storage compartments can be provided for storing parts and components, such as fittings, adapters, gauges, hand tools, etc.

A compressed air single stage or multi-stage desiccant filter can be provided with an inlet for filtering compressed inlet air or inlet gas. The filter can filter or dry moisture from the inlet compressed gas.

The inlet compressed gas can be processed by the separator assembly to produce a nitrogen stream and an oxygen stream. In other examples, nitrogen from a nitrogen source, such as from one or more nitrogen tanks, can be directed through the filter and through the separator assembly for further enhancement or purity at one of the outlets.

Alternatively or additionally, gas from one or more nitrogen tanks is routed through the separator assembly for purposes of regulating and controlling the various outlet streams at the assembly outlet, such as to control the application manifolds to simultaneously inflate multiple automobile tires or for other applications.

The outlet gas streams from the separator assembly may be used for any number of purposes, applications, and industries, including for filling automobile tires, for medical use, for inert gas, for purging, etc.

In an example, the separator assembly is rated for use with an inlet compressed gas source of between about 110 psi to about 200 psi with about 140 psi to about 180 psi being more preferred. Generally speaking, the higher the CFM flow rate of the inlet compressed gas and the higher the pressure, up to about 200 psi, the quicker the separator assembly can generate nitrogen and oxygen streams. However, the system can be configured to operate at a much lower pressure, such as in the order of about 75 psi to 110 psi, or a much higher pressure, such as in the order of about 200 psi to about 250 psi.

In an example, the first manifold is a 1×2 manifold. That is, the first manifold can have one inlet and two outlets. In other examples, the first manifold configuration can be different, such as a 1×1 manifold, a 2×2 manifold, a 1×3 manifold, or any number of inlet to outlet configurations. Any of the inlets and/or outlets can be plugged or capped or be connected to a supply source or a receiving source.

In an example, one of the outlets of the first manifold can be connected to an analog and/or a digital gauge, which can be displayed at the control panel, and another outlet can be connected to a second manifold for directing the gas stream to either a first charging tower or a second charging tower. A one way check valve can be used with any of the ports of the first manifold. Optionally, one or more control valves, such as switch valves or solenoid valves, can be used with any of the ports.

In an example, one of the outlets of the first manifold can be connected to a regulator and calibration system to calibrate the incoming oxygen and/or nitrogen level of the feed stream. Optionally, the outlet stream from the first manifold may be routed to a moisture analyzer or sensor to determine the moisture content of the compressed inlet gas.

The moisture content of the nitrogen stream for use to fill tires can be about 1.3% to about 2.5%. In other examples, the moisture content can have a different range.

The regulator and calibration system, which may also be referred to as an RC system, can comprise an inlet manifold, which can be connected to an RC manifold, and a control valve.

The RC manifold can have a number of ports to enable control of multiple streams passing through, such as in and out, the RC manifold. For Example, the RC manifold can have a body with one inlet and two outlet ports so that a compressed gas inlet stream, such as a pressurized nitrogen stream from the application manifold, can split into two or more streams for further processing, such as to sample for nitrogen content, pressure reading, and/or moisture content.

The inlet and outlet ports of the RC manifold can be equipped with block valves, controllable switch valves, spring loaded check valves, and/or orifices to direct flow in and out of the manifold. In an example, a pressured gas stream from an application manifold can flow through the RC manifold and then the manifold can split the streams to flow into the inlet manifold for sensing at least one of O2, N2, moisture, etc. and another stream to the controller to display pressure, as an example.

Discharge from one of the assembly outlets can also be directed to the RC manifold for sending to the controller.

The control valve, which can be a switch valve or a solenoid valve, can be actuated by a controller to open or close to permit or block gas flow. The control valve is configured to discharge gas to a pressure step-down regulator to reduce the gas pressure down to about 0.5 psi to about 2.5 psi.

Discharge from the step-down pressure regulator, for example 1 psi, can then be sent to an O2 sensor located in a manifold to sense the oxygen content of the gas stream. The manifold can include a port equipped with an orifice to allow gas to vent. The orifice can be sized to about 20 thousandths to about 40 thousandths to maintain an adequate back pressure.

Optionally, an in-line orifice may be used upstream of the step-down pressure regulator to reduce the incoming pressure to the pressure regular.

Output from the O2 sensor can be wired to the control housing, which can process the information, such as resistance or voltage readings or values, and converts the data to show nitrogen purity in percentage values, based on the ratio of oxygen to nitrogen in air.

In some examples, a nitrogen sensor is used instead of the oxygen sensor to directly measure nitrogen content in the gas stream.

In still other examples, both an O2 sensor and a N2 sensor are used to separately sense oxygen and nitrogen molecules in the gas stream and then displaying both values. The values, in percent oxygen and percent nitrogen can be displayed on the controller box.

In an example, a moisture sensor may be connected to the manifold or in a separate mounting body for sensing humidity or moisture content of the gas stream.

In an example, the second manifold can be a 3×2 manifold. That is, the second manifold can comprise three inlets and two outlets.

At least one of the inlets of the second manifold can be used to receive the compressed gas from the first manifold, which can be compressed air or compressed nitrogen from a nitrogen source.

One or both of the other inlets of the second manifold can be plugged or capped off or can alternatively be used for sensing the air stream, the moisture content, oxygen molecule content, etc. of the inlet compressed gas stream.

The two outlets of the second manifold can each be connected to a control valve, such as a switch valve or a solenoid valve. In an example, the two valves can comprise a general purpose 2-way solenoid valve operable on 12 VDC. The power can be from an on-board battery power that is rechargeable or from 120 VAC or 240 VAC utility power that is then converted to DC power. In other examples, the various control valves can be selected to operate on different power input, such as 24 VDC.

The controller or all electronic components used in the separator assembly can operate on portable DC battery power or from AC utility power.

A controller and mother board, including storage, a PCB with I/O and comm ports, Blue Tooth connectivity, and WiFi capability can be incorporated with the separator system and can be located inside the control housing.

The controller can selectively control or activate which of the control valves connected thereto to activate, actuator, or de-activate. The controller can actuate a valve at the second manifold to selectively control which of the two outlets of the second manifold to open to then permit compressed gas to flow into either a first charging tower or a second charging tower, each tower housing a quantity or bed of carbon molecular sieve (CMS) absorbents or elements.

The controller and mother board can store any of the values read during any service procedure, such as N2 percentage, O2 percentage, pressure readings, moisture readings, temperature readings, elapsed time, fill time, etc., and can send or deliver the data to the Cloud for additional processing. The stored data can also be uploaded to a computer or a smart phone for viewing and analysis.

Authentication and security measures can be implemented to initiate the separator system, access data, send/receive data, etc.

In an example, the CMS absorbents are selected to absorb oxygen molecules within the pores of the CMS elements but not nitrogen molecules. Thus, nitrogen is separated from the oxygen molecules and are allowed to pass through to the storage tank, if meets the nitrogen purity set point else the stream can be purged to atmosphere.

In some examples, the CMS elements are selected to collect or absorb nitrogen molecules to enable purification of oxygen molecules in a stream to be collected in a storage tank.

In an example, the two charging towers are pressured metallic canisters each comprising a body, a first end, and a second end. In an example, the body can be an extruded pipe or pipe section. The two canisters or towers can have the same size or volume, such as having the same body shape, and can be rated the same, such as having the same pressure operating range, same attached ports or nozzles, and same closure caps, panels or flanges for closing and opening to access the interior of each respective tower. In other examples, the two towers are different.

Closure panels or caps can be used with each of the two charging towers. The end caps can be threadedly connected to the body of the vessel or tower to enclose the ends of the towers. In other examples, each closure panel or cap is connected to the body of the vessel or tower by bolt connections having a gasket or a seal between two flanges, similar to bolted flanges. Other conventional attachment means between the body of each canister and an end cap are contemplated for opening and accessing the charging towers, such as for filling, changing, or adding CMS absorbents or elements. A bottom end cap for enclosing a bottom of each tower can be welded to the body while an upper end cap is bolted to the upper opening of the body.

A first end plate having an inlet may be used to enclose one of the ends of a pipe section and a second end plate may be used to enclose a second end of the pipe section, which can also be used as a cap to access the interior of the pipe section for filling and servicing the towers.

In an example, a bottom end cap can be welded to the bottom opening of each extruded pipe. In an example, a singularly formed upper cap can be sized and shaped to enclose the open ends of both extruded pipe sections. The singularly formed upper can be integrated with flow channels for gas outlet flowing out of the two towers.

An exemplary end cap for closing a lower end of an extruded pipe to form one or both charging towers can include flow channels. In an example, the end cap can be made from a round metallic plate, such as a round aluminum plate, with a desired thickness sized for the operating pressure range of the separator assembly.

The end cap can have a perimeter and a plurality of flow holes recessed inwardly from the perimeter. The end cap can be welded to the bottom opening of the extruded pipe.

In an example, the plurality of flow holes on the bottom end cap are interconnected, such as being in fluid communication with one another. The flow holes can connect via one or more sub-surface flow paths that are machined into the wall thickness of the end plate.

One or more entry openings from a side of the end plate may be made, such as machined, to form the sub-surface flow paths. Two entry openings can be machined into the thickness of the end plate to form an "X" shape sub-surface flow paths that intersect one another.

The side entry openings into the end cap may subsequently be used to receive inlet compressed gas, such as inlet compressed air. Un-used side entry openings, if any, may be plugged or sealed off, such as with a plug or screw.

In an example, a matching hole can be machined through the side of the body of the pipe section and aligned with one the side entry openings on the end cap. Thus, when the end cap or end plate is seated at the open bottom end of the body section, the hole machined through the side of the body and one of the side entry openings can align.

The side opening of the body and the aligned side entry opening of the end plate can receive gas flow from the second manifold and the gas can then be permitted to flow through the plurality of flow holes via the sub-surface channels. The other side entry opening for machining one of the sub-surface flow channel can be butted up against the interior side surface of the pipe section.

The bottom end plate can be welded to the bottom opening of the body to enclose the bottom end of the tower. In other examples, the bottom end plate is bolted to the body.

Four flow holes can be provided adjacent the perimeter of the bottom end plate and one central hole can provided at an intersection of at least two sub-surface flow paths or channels. In other examples, more than or fewer than four flow holes can be incorporated and additional inwardly positioned holes may be machined and connected to the sub-surface flow paths. I The plurality of flow holes and sub-surface flow channels allow inlet compressed air flowing into the aligned holes of the body and the side entry hole of the end plate to be distributed or disperse across the cross-sectional area of the extruded pipe so as to more efficiently interact with the CMS absorbents.

In another example, a single through hole is provide through the body of the end plate and a header made from tubing or piping is connected to the single through hole on the bottom end plate to provide distributed flow paths for the inlet compressed gas through the body. For example, an X-shape manifold can be provided at the upper surface of the bottom end plate and in fluid communication with the single hole machined through the bottom end plate to provide a plurality of spaced apart flow holes formed through the X-shape manifold for air flow.

The interior of each charging tower can comprise a plurality of carbon molecular sieves absorbents, such as a bed of CMS elements or absorbents, located on a screen structure, which can be placed over the bottom end plate and covers the plurality of flow holes on the end plate.

The screen structure is configured to prevent the CMS absorbents from falling into the flow holes of the bottom end plate and possibly clogging the flow holes and/or the sub-surface flow paths. Alternatively or additionally, the screen structure can break up the gas flow flowing upwardly out from the plurality of flow holes on the bottom end plate to disperse the gas as it rises through the column or bed of CMS absorbents.

In one example, the screen structure can comprise two separate screen layers. The first lower screen layer can comprise an aluminum screen in contact with the bottom end plate. The lower screen layer can be made from fine aluminum mesh with thickness, formed from multiple layers or from one layer, of about 1 to 2 mm thick. The mesh size can be in the order of 0.5 to 2 millimeters or in the order of micron size. The mesh size should be smaller than a CMS element to prevent the CMS element from passing therethrough.

The second layer can be located above the first layer and can comprise ¼ inch thick Scott-bride maroon color nylon pad from McMaster-Carr having very fine mesh pad with aluminum oxide imbedded therein.

In some examples, the first layer can directly contact the end plate and the second layer can directly contact the first layer.

Other screen layers having the appropriate mesh size are contemplated for use with the present assembly including for use with the screen structure. For example, a third filter, such as a felt sheet, having a 100 micron to 200 micron size can be placed on top of the second layer to further minimize the likelihood of any CMS element possibly falling into the flow holes of the bottom end plate.

The felt mesh filter layer can also assist in dispersing gas flow rising out from the end plate and flowing upwardly towards the outlet end plate. The felt layer can assist to filter any grease or oil in the gas streams.

In an example, a second set of screen structure can be placed at the top of each stack or bed of CMS absorbents, at or near the upper end of the tower, in each charging tower to prevent or limit unwanted carryover flow of the CMS absorbents out the discharge port or ports of each tower.

In an example, each upper set of screen structure can be the same as the lower screen structure. In alternative embodiments, the upper and lower screen structures can be different, such as having different mesh sizes, different mesh materials, etc. For example, the upper screen structure located above the stack or be of CMS elements can be a single felt mesh filter layer 246 only, without any other screen layer.

Each screen structure can optionally be packaged in a cage or frame for convenient handling of the multi-piece structure as a single integrated unit. In one example, the upper screen structure near the outlet can be fastened or secured to the outlet end plate. This can ensure proper positioning of the upper filter and can screen or block out CMS elements from being displaced out the tower via the one or more outlet ports.

In an example, the screen structures can have a circular or rounded perimeter and can fit within the interior of the tower in a snug or size-on-size fit. In another example, part of the perimeter of the screen structure can abut or be folded so that the perimeter of the screen can push against the interior of the pipe section of the tower and face upwardly or downwardly. The screen structures can either float within the interior of the towers or can be tied or secured within the interior.

Each charging tower can be filled with CMS absorbents by first placing the lower screen structure over the lower end plate or over the bottom of each respective body. Then a first pour of the CMS absorbents can be directed or placed inside the tower to a filled level. In one example, the first pour into the tower can be performed manually using a scoop or a scooper and then filling the tower to a desired filled height or filled level with CMS absorbents.

In other examples, a dispensing system can be provided to automate the filling process. The dispensing system can include a silo or storage vessel for storing bulk CMS absorbents, belts, rollers, and dispensing components for transferring some of the bulk CMS absorbents into the charging towers.

In some examples, a settling device can be used to pack and settle the CMS absorbents or elements inside the charging towers. For example, a movable plate or platform may be placed in contact with a charging tower to be filled and the charging tower is moved by the movable plate or platform during filling to facilitate packing the CMS elements inside the charging tower to produce a packed CMS element level. The steps can repeat after the level drops due to the packing of the CMS elements. Each subsequent re-fill or re-pour steps can raise the overall level of CMS elements to a CMS filled level and then drop due to the settling or packing process. The process can repeat until the drop in CMS level is minimal or meets certain parameters.

In some examples, the charging towers can be shaken by hands to pack the CMS elements. In other examples, a slow moving belt can wrap around the charging tower and moves the charging tower as it is being filled.

In still other examples, a base that vibrates or shakes can be used to move the charging tower during filling to pack the CMS elements into the tower.

Thus, an aspect of the present disclosure is understood to include a charging tower having a first closed end and a second end that is sealable with a removable cap and wherein the charging tower is filled with CMS elements that have been packed into the interior of the tower by shaking, agitating, vibrating, or combinations thereof.

In an example, the packed CMS elements can be located between a first set of screen structure and a second set of screen structure.

In yet other examples, an impact device for imparting an impulse, impulse force, or an impact is used to pack the CMS elements. The settling step to pack the CMS elements can be performed during the filling step, after the filling step, during a re-fill or re-pour step, or combinations thereof.

In one example, after the CMS elements are filled to a desired filled level inside the charging tower, an impulse or impulse force can be imparted to the charging tower to allow the small CMS elements to settle and pack within the charging tower. In some examples, the settling step can last for the duration of time that it takes for the CMS elements to visually decrease or shorten in height within the charging tower, which is indicative of the CMS elements packing into the charging tower during the impulse generating step.

After the CMS elements settle following the first pour into the charging tower and following the settling step, the column height of the CMS elements from the first fill or first pour reduces from the filled level to a first CMS packed level.

A second pour or subsequent re-pour of CMS elements can be added to the charging tower to bring the CMS stack height to the filled height or level, such as to top off the tower from the first CMS packed level with additional CMS elements.

The charging tower can be moved against to pack the newly added CMS elements. The newly added CMS elements can be packed by shaking, agitating, vibrating, inducing impulses to the tower or combinations thereof. This settling or packing step can bring the CMS elements filled level back down to a second CMS packed level, which is higher than the first CMS packed level but lower than the filled level. The process can then repeat until the level of packed CMS elements does not substantially drop below the filled level following the packing or settling step.

In practice, it has been found that 4 to 7 pours, or 3 to 6 re-pours after the first initial pour, in combination with shaking, agitating, vibrating, inducing impulses to the tower or combinations thereof to pack the CMS elements may be employed to ensure a properly packed charging tower filled with a bed of packed CMS absorbents.

The filling of CMS elements and settling or packing process of the present disclosure can produce the following sequence: CMS element filled level, first CMS packed level, CMS element filled level, second CMS packed level, CMS element filled level, third CMS packed level, CMS element filled level, fourth CMS packed level, etc., up to about a seventh or eighth CMS packed level.

In an example, a fifth CMS packed level is within 1-inch of the CMS element filled level. In an example, a sixth CMS packed level is within 1-inch of the CMS element filled level. In an example, a seventh CMS packed level is within 1-inch of the CMS element filled level. In an example, an eight CMS packed level is within 1-inch of the CMS element filled level. In other examples, the fifth, sixth, seventh, or eight CMS packed level is within 1-inch of the CMS element filled level.

Each subsequent fill or re-pour of CMS elements can also or alternatively be measured in pounds of CMS elements added to the charging tower to a CMS element filled level. In an example, each subsequent CMS fill step after the first pour decreases in weight following the first filled step. For example, the first pour can require 14 pounds of CMS elements to fill to a CMS element filled level. Then after the settling step, the tower can require an additional 1.75 pounds to refill the tower with CMS elements to the CMS element filled level. Then upon further compacting the CMS elements, the next pour can require an additional 1.25 pounds to fill the charging tower to the CMS filled level. Then the next pour can require an additional 0.75 pound and possibly one additional pour of yet another 0.25 pound to fill the charging tower to the CMS filled level.

In an example, the number of re-pours to fill the charging tower to the desired level or to the CMS filled level when the CMS elements are packed is the number that corresponds to a re-pour of 0.5 pound or less or to a height that is within 1-inch or less of the CMS filled level. In other examples, the charging towers can be over-sized and the pounds of CMS elements and/or height that is within the CMS filled level can vary.

Alternatively and less preferred, the charging tower may be used after the first pour without any or without the multiple packing and settling steps. In some examples, the charging towers can be over-sized for an intended application so that the CMS elements may be placed therein without having to pack the elements with multiple discrete pours and multiple settling steps.

In an example, an impact element, such as a billet, a metal stock, or a metal bar, which can be coated or covered with a non-metallic coat, such as a rag, a towel, a polymeric jacket or cover, can be used to impart an impulse or an impulse force to the charging tower during the pouring step, after the CMS elements have been poured into the tower to pack the CMS elements, during the re-pour step, after the re-pour step, or combinations thereof.

The impact element can impart about 50 blows to about 200 blows to the tower to settle the CMS elements inside the charging tower for each discrete pour. In some examples, the number of blows can range from about 120 to about 140.

In other examples, the number of blows to impart impacts to the towers and settle the CMS elements, such as to pack the CMS elements, can be measured in time, such as about 5 minutes to about 10 minutes at slow, moderate, or fast impacts.

Where a movable device is used for the settling device, such as a belt or a vibratory plate or base is used, the settling device should be controlled to induce or introduce intermittent shaking or moving forces on the charging tower to be filled. By intermittently inducing a force on the charging tower to move the tower and the CMS elements located therein, the elements can be provided with opportunities to settle rather than continually shift with a continuous force inducing source.

After the separator assembly undergoes a calibration procedure, a signal can be displayed on the control housing to indicate whether the assembly is ready to continue or an error has been detected following the calibration.

Other information may be displayed at the same time at the start of the process, such as displaying the model type or size, temperature readout, error code readout, etc.

If the separator assembly is ready to begin to generate nitrogen after the calibration step, the user can be directed to push a start button or switch to begin producing nitrogen gas. In one example, an LED light can be associated with a start button to indicate where to press to initiate the process.

If the user hits the start or charge switch on the control panel, the assembly can begin to direct compressed air via the filter, the first manifold, and the second manifold, through the first charging tower to begin separating the compressed air stream to produce pressurized nitrogen gas and/or pressurized oxygen.

As pressured air enters the interior of the first charging tower through the plurality of flow holes on the bottom end plate, the relatively smaller size oxygen molecules are collected inside the pores of the carbon molecular sieve elements while the relatively larger size nitrogen molecules flow through the bed of CMS elements and accumulate in the first charging tower.

In an example, nitrogen produced in the tower can discharge directly out the outlet of the tower without accumulating or is being accumulated by the valve at the outlet manifold if the set point has not met. The mechanisms that CMS elements employed to separate oxygen molecules and nitrogen molecules from an air stream are well known in the art and will not be discussed herein.

In an example, the stream of compressed gas is allowed to travel through the bed of CMS elements and exit out an outlet port at the top of the charging tower and into flow channels of an outlet manifold.

The direction of gas flow into either the first charging tower or the second charging tower can be controlled by the second manifold, which has a switch or switches that are controllable by a controller. Thus, when one tower is being charged with compressed air, such as first tower, the other tower, such as the second tower, is allowed to exhaust to the atmosphere through the same second manifold.

The outlet manifold can be considered a top end plate with flow channels incorporated therewith. The flow channels of the outlet manifold can be integrated in a unitary body or plate or assembled from two or more plates or bodies with tubing, fittings, and/or other components.

The outlet manifold can comprise a body or plate having a lower surface facing the towers and an upper surface facing away from the towers and a thickness therebetween. Two grooves can be provided on the lower surface of the plate for mating against the upper openings of the two charging towers, optionally with a gasket or O-ring located between each tower and the plate.

The plate of the outlet manifold has a perimeter that can be provided with bolt holes for use to bolt the upper plate to the two towers. The bolts allow the plate to be removable from the two towers to access the interior of the towers, such as to load the towers with CMS elements.

In an example, at least one outlet port is formed inside the boundary defined by the two grooves. For example, one or more outlet ports can be provided within each groove boundary for allowing gas from inside the respective tower to flow out, such as nitrogen molecules. Nitrogen generated inside the two towers can exit the towers via the outlet ports and then pass through flow channels to be directed elsewhere, such as to a storage container or to end receiving devices, such as automobile tires.

Flow paths or channels can form in or with the outlet manifold, such as machined into the thickness of the plate of the upper end plate. Entry points into the plate to create the flow paths can be plugged off using a threaded plug and the like.

The flow paths or channels in the outlet manifold can be in fluid communication with the two outlet ports located within the boundary of the groove or to additional outlet ports located within the groove boundary, if incorporated.

In one example, the two discharge flow paths, one for each charging tower, are not in fluid communication with one another such that exhaust stream from each charging tower flows directly into a secondary outlet manifold without mixing. As both towers can be connected to the primary and secondary flow paths, a control valve located with the secondary outlet manifold and/or in the common discharge line can be incorporated to direct flow.

The two discharge flow paths, one for each charging tower, can be isolated from one another by providing a blockage somewhere in the common discharge line, such as a plug or a solid surface. The blockage portion between the two flow channels can be located at any number of locations along the common discharge line.

The two discharge flow paths can be in fluid communication with one another by providing a flow path through the middle point between the two flow paths. In one example, a flow through, such as a control valve, can be provided at the middle point to enable control of when the two discharge flow paths fluidly communicate with one another. The control valve can be wired to the control housing so that the controller can control when to energize and de-energize the valve for fluid communication between the two discharge flow paths via the common discharge line.

In other examples, the flow through can embody an orifice so that the two discharge flow paths are in constant fluid communication with one another. When provided with an orifice instead of a control valve for the flow through, the orifice size can be around 3 thousandths to 20 thousandths of an inch in diameter. In some examples, the orifice can have a smaller range of about 3 to 10 thousandths of an inch.

Assuming a scenario in which the first charging tower is first provided with compressed air from the second manifold, nitrogen discharges out the first charging tower via the outlet port into the first discharge line of the outlet manifold and into the common discharge line, which connects the two discharge lines if a flow through is provided, such as with an orifice or a switch valve.

The discharge flow, which can have a high concentration of nitrogen molecules, can then enter a first discharge channel located between the discharge manifold and the secondary outlet manifold.

A spring loaded check valve can be provided in the first discharge channel, which permits gas flow to flow out the secondary outlet manifold from the discharge manifold but not from the secondary outlet manifold back into the charging tower.

Concurrently, if a flow through is provided, such as an orifice or a control valve, high concentration nitrogen molecules can flow through the flow through located in the common discharge line and into the second charging tower via the discharge line to provide the second charging tower with nitrogen molecules while the charging tower seats idle or is in purging mode to purge oxygen out to the atmosphere via the second manifold.

In an example, a secondary outlet manifold comprises three outlets. One outlet can be equipped with an orifice to provide back pressure to the assembly. The orifice at outlet can have a diameter of about 10 thousandths of an inch to about 30 thousandths of an inch. Alternatively, a control valve, such as a switch valve or a solenoid valve, may be used to selectively open or close outlet.

A second outlet can be controlled by a control valve. Functions of the control valve at the outlet of the secondary manifold can be controlled by the controller.

A third outlet on the secondary outlet manifold can be directed to the regulator and calibration system and particularly to an O2 sensor to sense the oxygen molecule content in the stream, which can be converted to nitrogen value through known oxygen to nitrogen ratio.

In an example, if the nitrogen molecule content in the stream is at least 98.2%, as an example, the control valve in the secondary outlet manifold can be activated to allow the highly concentrated nitrogen stream to flow to a storage tank. If the value is below the 98.2% set point, as an example, the control valve can remain closed and instead the second manifold can be activated to purge the contents of the first charging tower and switches direction to begin charging the second charging tower while the first charging tower purges to atmosphere.

The set point for the nitrogen stream can be adjusted to a higher value than 98.2%, such as up to about 99.8%, before the stream is routed to the storage tank.

The outlet manifold can be made from two or more end plates or parts. The body of the outlet manifold can have a plurality of bolt holes for receiving bolts or screws for mounting the body to the two charging towers. Two check valves can be located between the primary and secondary manifolds.

In the present embodiment, middle point between the flow channels of the primary outlet manifold in the common discharge line inside the primary outlet manifold can be blocked. To allow the two discharge flow paths inside the outlet manifold to be in fluid communication, a bypass header can be provided, which can be mounted to the upper surface of the body.

The bypass header can include a through bore located between two end openings. Two ports formed with the body, which are connected to flow channels formed within the body, can connect to the two end openings of the bypass manifold thereby allowing the flow channels to be in fluid communication with one another despite being blocked at the middle point.

The bypass header can allow for a restriction device to be placed inside the bore. The restriction device can be a nipple or a solid washer and machined or drilled with a desired orifice opening, such as about 3 thousandths to about 20 thousandths. The two flow channels inside the primary outlet manifold can therefore be in fluid communication with one another via the bypass header, which can include a restriction device having an orifice.

In still other examples, rather than a single unitarily formed primary outlet header, a bypass header, and a single unitarily formed secondary outlet header, multiple end plates and headers can be incorporated and connected to one another via tubing, fittings, valves, etc. For example, the primary outlet manifold can be made from two separate end plates each with a groove for mounting to a respective charging tower and each with flow channels that can connect to the other separate end plate using fittings and tubing.

In other examples, additional pairs of charging towers can be included to increase the nitrogen and/or oxygen production capacity of the separator assembly. For example, the assembly can include six charging towers or more, or three pairs of towers that can be used to charge and purge. The three pairs of towers can operate in parallel or serially using the principles described herein.

If the nitrogen reading is at least 98.2%, or at some other set point that can be adjusted at the control housing, then the control valve at the outlet manifold can be activated to permit flow to flow through the control valve and out the outlet to then fill the nitrogen storage tank.

The flow can continue out the control valve at the outlet manifold until the nitrogen purity reading from the outlet to the RC system falls below the set point. In some examples, the set point can be adjusted to 80% nitrogen level or higher. For example, for medical or scientific applications, the nitrogen set point can be set to 99.3% before the nitrogen is permitted to exit the outlet through the control valve to fill the storage tank. For school or education applications, a lower reading, such as 85% may be sufficient. For other applications, such as for filling automobile tires, the set point can be set to about 98.2% or higher. Other values for other applications and industries are contemplated, including food, cosmetic, aerospace, manufacturing, marine, agricultural, oil & gas, chemical plants, automotive, etc.

If the nitrogen level detected out the outlet of the secondary output manifold falls below the set point, such as when the system is first initiated or after drawing down nitrogen from the same first tower for some period, then the controller, which can be a micro-base controller and control board, can switch the tower to be charged and tower to be purged. In an example, the control valve or valves at the second manifold can be activated so that discharge flow out the second manifold is can now be directed to the second charging tower and pressure in the first charging tower, which has residual nitrogen content that have fallen below the set point, is allowed to purge out the second manifold.

The second manifold can comprise a body or housing with five different ports. In other examples, the number of ports can vary.

The ports of the second manifold can include two discharge ports for filling the charging towers, an inlet port, and two purge ports. In an example, a muffler or silencer can be mounted at each of the two purge ports to drop or lower the sound of releasing gas.

A muffler, silencer, or sound suppressor can be provided. The sound suppressor can have a housing and an inlet.

The inlet of the sound suppressor can be connected to an outlet of the second manifold. Two sound suppressors can therefore be connected to the two outlet ports at the second manifold.

The two sound suppressors can suppress sound caused by discharge gas flowing out the outlet ports at the second manifold.

In an example, the housing of the sound suppressor has two end caps, one at each end of the body of the housing.

The inlet port can form with one of the end caps. The housing and end caps can be made from a metal material, such as from aluminum, or can be molded from a durable plastic material.

Internally of the housing of the sound suppressor, felt material or felt sheets in combination with flow channels or baffles can be provided to slow down the discharge gas velocity and muffle the sound created by the fast moving gas discharging from the second manifold.

The inlet port of the second manifold is configured to receive compressed gas from the first manifold. An electro-mechanical motor having a movable stem can be provided with the housing. The motor can be activated when energized with 12 VDC, or on other power input depending on the motor selected. When activated, the stem moves to direct flow out the first outlet port or the second outlet port. The stem can be provided with multiple valve seats to close one of several different ports, but not the inlet port.

In an example, when the motor at the second manifold is actuated, the stem moves to block one of the purge ports, i.e., first port, with one of the valve seats. The first purge port can be open to atmosphere.

The valve seats can also be moved by the stem and block the flow header in way that inlet compressed gas from the inlet port can only flow out the first outlet port to supply the first charging tower, for example, with compressed gas, such as compressed air at certain desired inlet pressure. When the stem moves as noted, the second outlet port is open or is in fluid communication with second purge port, which is open to atmosphere.

If the second charging tower is pressurized higher than atmospheric pressure, pressure from the second charging tower will flow out through the same line that connects to the second outlet port to then flow out second purge port.

When the motor is actuated again at the second manifold, the stem can move in the opposite direction so that second purge port is blocked and the second outlet port is open for fluid or gas flow from the inlet port. Inlet gas flow from inlet port is now directed through second outlet port only. In this actuated position, the first outlet port is open or is in fluid communication with first purge port. Thus, pressure from the first charging tower connected to first outlet port can flow back through first outlet port and out first purge port. The second manifold can reverse direction again when actuated and repeat.

When the first charging tower is open to the atmosphere via the second manifold, oxygen molecules trapped by the CMS absorbents inside the first charging tower as well as residual nitrogen molecules are released into the atmosphere. At the same time, the upper chamber of the first tower receives high concentration nitrogen molecules via the second charging tower through the flow through, such as through an orifice located at middle point between two outlet flow channels of the outlet or output manifold.

The stream in which high nitrogen concentration from the charging tower that is being charged sent to the other charging tower that is being purged via the common discharge line, and through an orifice or a valve, may be referred to as a cleansing stream when incorporated.

The cleansing stream allows the purging tank, which is understood to mean the tank that is being purged of trapped oxygen molecules, to quickly charge while the charging tank, which is understood to mean the tank that is receiving pressurized air to then separate the nitrogen molecules from the oxygen molecules, continues to generate nitrogen.

Nitrogen molecules discharging from the outlet port of the second charging tower can flow into the discharge flow path then through the second discharge channel and through the spring loaded check valve. A stream can be directed through the outlet of the secondary outlet manifold and to the oxygen sensor at the regulator and calibration system to be checked against the set point before the nitrogen molecules can be permitted to flow through the control valve and out the outlet and into the storage tank.

A storage tank can be a cylinder, can be sized for pressure services of about 90 psi to 4,000 psi operating range and can have a volumetric capacity of about 20 gallons to about 1,000 gallons. However, since inlet pressure to the separator system is typically reduced to about 90 psi to 130 psi, the storage tank will not likely see pressures at its upper rated range.

Optionally, two or more tanks can be arranged in parallel or serially to increase the total system storage capacity. The storage tank can be configured to receive discharge nitrogen stream from the secondary outlet or output manifold at the set nitrogen purity or higher.

The storage tank may have multiple ports that can be used for inflow, outflow, pressure gauges, sensors, etc. Three ports can be provided with the tank, one port for inflow and two ports for outflow streams. In other examples, additional ports or fewer ports than can be incorporated. For example, a pressure relief valve can be connected to one of the ports or to a fourth port to relieve pressure inside the tank when the pressure exceeds the set point of the relief valve.

In one example, one of the ports at the tank is connected to an application manifold via a control valve. A 1×2 lead manifold can be incorporated upstream of the control valve, which can have one inflow port and two outflow ports. When incorporated, the gas stream from the port of the storage tank can be routed to the inflow port of the lead manifold.

The first outflow port of the lead manifold can be routed to the RC system to sense and read data regarding the gas stream, such as moisture content, nitrogen purity, oxygen content, temperature, pressure, etc. The second outflow port of the lead manifold can be directed through the control valve and then to the application manifold.

The lead manifold can have different port configurations, such 2×2.

In an example, the application manifold can be provided with multiple controllable outlet ports, including a plurality of dispensing ports for use to connect to a plurality of items to be filled or dispensed into. In an example, four dispensing ports are provided with the application manifold. In an example, each of the dispensing ports is connected to a control valve that can be individually controlled by the controller to dispense or discharge, independent of the other dispensing ports.

In an example, each port of four dispensing ports can be connected to a control valve and then a fill hose connected downstream of the control valve for use to fill an automobile tire. The configuration allows for four tires to be filled simultaneously or separately, such as one at a time, two at a time, etc., as controlled by the controller directing whether to activate or not activate the corresponding control valve associated with each dispensing port.

An additional port can be provided with the application manifold and connected to a control valve. The control valve with the additional port can be used to release pressure from the application manifold to depressurize the application manifold before decoupling the one or more hoses connected to the dispensing ports.

In an example, a chuck valve can be used with each of the hoses that are connected to the dispensing ports. The chuck valve can remove a valve stem from each tire to be filled to allow the contents inside the tire to be purged before the tire is filled with nitrogen. The chuck valve can provide a closed system so that while the valve stem is removed and the enclosed spaced is purged, the valve stem can be placed back in without allowing air to be trapped. The now replaced valve stem can now hold nitrogen that is filled inside the tire in the same chuck valve.

The application manifold can further include a sampling port. The sampling port can be directed to the RC system to sense and read data regarding the gas stream, such as moisture content, nitrogen purity, oxygen content, temperature, pressure, etc. Alternatively or additionally, gas stream from the sampling port can be routed directly to the controller to read pressure or other readings not involving nitrogen, humidity, moisture, or oxygen.

In some embodiments, additional application manifolds, such as two or more application manifolds, for example three additional application manifolds, maybe added and connected serially to other application manifolds or directly to different ports located on the nitrogen tank. Each additional application manifolds can be connected downstream of a lead manifold, similar to lead manifold.

For agricultural applications, the nitrogen gas generated by the gas separator assembly can be used for or as fertilizer.

In an example, discharge nitrogen gas from the storage tank can be routed to a manifold, which can be connected to a control valve and to a controller. A flow manifold can be connected downstream of the gas manifold to disperse the nitrogen gas to different paths to fertilize plants, trees, shrubs, or combinations thereof.

The feed to the plants, trees, and/or shrubs from the gas separator assembly can be nitrogen gas only or the gas stream can be mixed or combined with water to both fertilize and water the plants, trees, and/or shrubs.

The gas separator apparatus or system can be on a timer to time when to discharge the nitrogen gas. For example, the system can activate to discharge nitrogen gas flow to a flow header at set time intervals and for set time durations, such as every 3 hours for 5 to 15 minutes, every other day, every day, several times per day, etc.

Various watering devices can be connected to the gas separator assembly to both water and fertilize. For example, mixers, eductors control valves, tees, dispersed nozzles, drip system or lines, sprinklers, etc.

The controller with the gas separator system can open a control valve on the separator system to output nitrogen gas as described elsewhere herein. In some examples, the gas separator system can open both open a control valve on the separator system to output the nitrogen gas as well as the controller on the water system to discharge water flow for the combination nitrogen gas and water stream to both irrigate and fertilize.

Methods of using and of making the gas separator assembly and components thereof are within the scope of the present disclosure.

BRIEF DESCRIPTION OF THE DRAWINGS

These and other features and advantages of the present devices, systems, and methods will become appreciated as the same becomes better understood with reference to the specification, claims and appended drawings wherein:

FIG. 4A is a schematic view of a second manifold of FIG. 2.

FIG. 5 is a schematic diagram depicting an outlet manifold for directing outlet gas streams.

DETAILED DESCRIPTION

The detailed description set forth below in connection with the appended drawings is intended as a description of the presently preferred embodiments of gas separators, such as air separators, and components provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
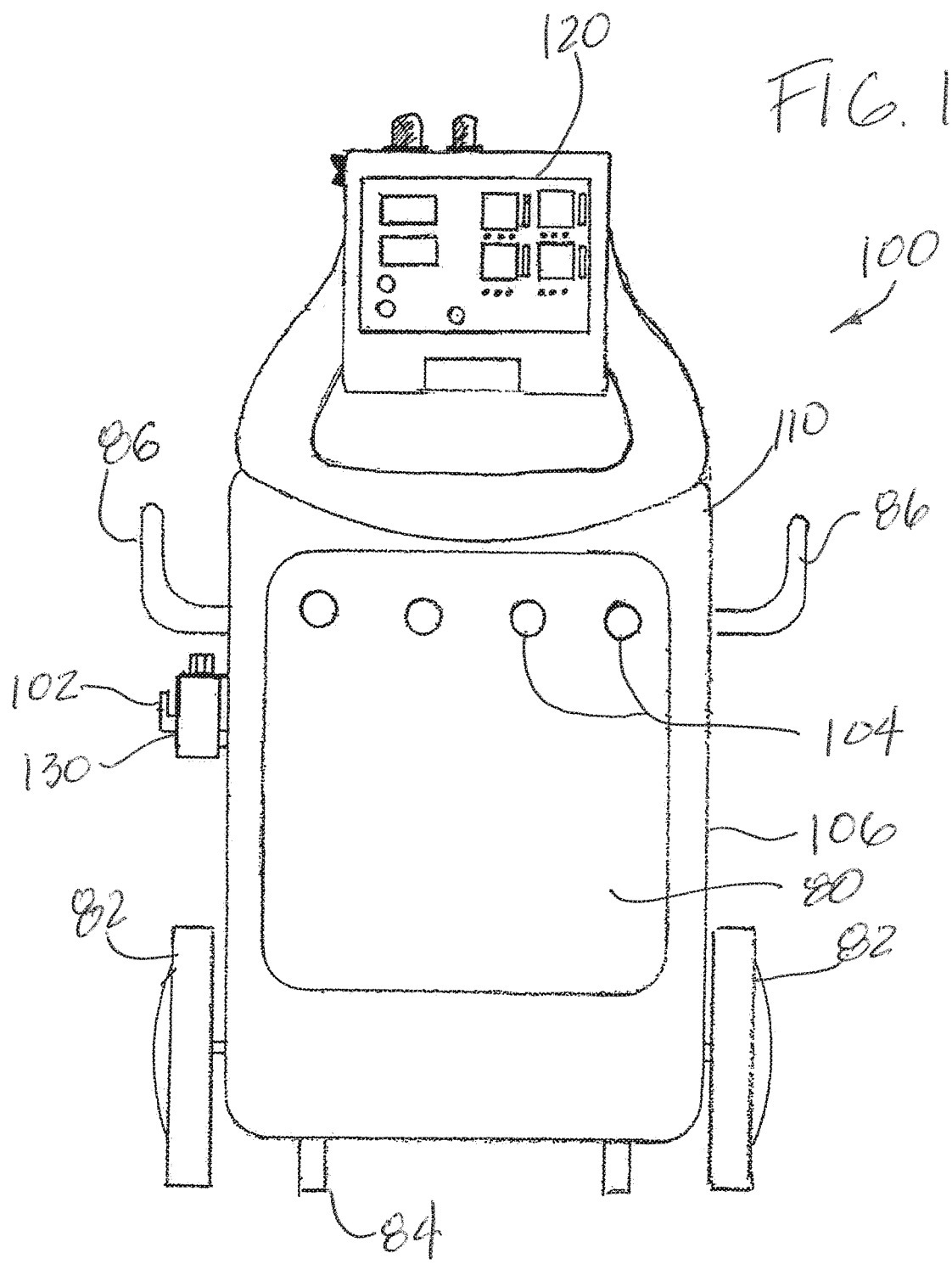
FIG. 1 is a schematic diagram depicting a gas separator apparatus in accordance with aspects of the present disclosure.

With reference initially to FIG. 1, a schematic diagram showing a gas separator assembly 100 in accordance with aspects of the present disclosure is shown. Broadly speaking, the gas separator assembly 100, such as an air separator, is configured to receive compressed gas at the gas inlet 102, process the compressed gas, and provide for at least two different discharge streams at a first outlet 104 and a second outlet 106. The first and second outlets 104, 106 can each comprise one or more outlet ports for producing one or more streams and can be positioned at any convenient location on the assembly. In an example, the second outlet 106 can have four regulated discharge ports for outputting to four different tires. The first outlet 104 can also comprise one or more ports for discharging first discharge gas streams. The first and second gas streams can be oxygen and nitrogen streams. The gas inlet 102 can similarly have multiple ports to receive multiple inlet streams. For example, a first inlet port can be sized and shaped to receive pressurized nitrogen and a second inlet port can be sized and shaped to receive compressed air, such as from an air compressor.

Optionally, multiple manifolds may be used for outputting more than four regulated discharge streams, such as eight, twelve, sixteen or more regulated discharge ports at the first outlet 104, the second outlet 106, or both. In an example, the compressed gas is compressed air and the two outlet streams can comprise a nitrogen stream comprising nitrogen molecules and an oxygen stream comprising oxygen molecules.

The separator assembly 100 can include a housing 110 for housing tanks or vessels, flow lines, which can include tubing sections, fittings, hoses, tools, valves, sensors, electronics, and optional portable power, which can comprise a rechargeable DC battery power for powering the controls in the controller housing, valves, and sensors, among others. A control panel 120 with a programmable controller is provided with the housing 110 for controlling operations of the various components, such as switches, as further discussed below. The housing 110 may include one or more housing panels 80 attached to a frame or chassis for covering the various separator assembly components. The frame can be made from a metal material, such as from extruded metal, and the housing panels 80 can be made from thin metal sheets, from plastic, or both. A pair of wheels 82 can be provided to aid in moving the housing 110 around, such as by tilting the housing and moving the housing about the two wheels. A pair of kickstands 84 can be provided to support the housing when not in motion. Alternatively, a pair of swivel casters can be provided with the pair of wheels 82 to enable moving on four wheels. Still alternatively, the housing can be provided without any wheels for stationary mounting.

One or more hooks or hangers 86 can extend outwardly from the housing to provide anchor points for hanging things or items therefrom, such as for hanging hoses, electrical cords or cables, etc. Pockets and/or storage compartments can be provided for storing parts and components, such as fittings, adapters, gauges, hand tools, etc.

Figure 2:
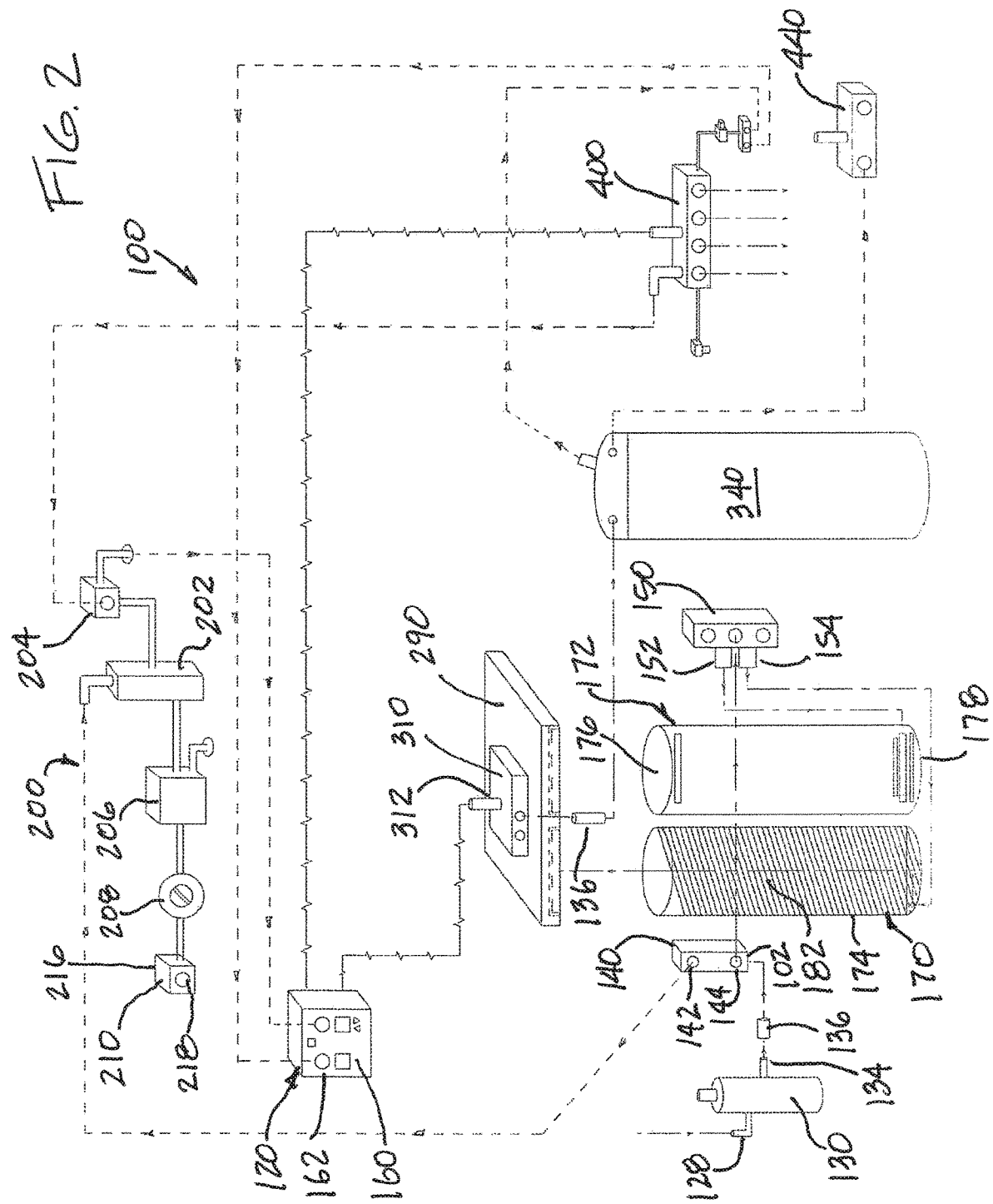
FIG. 2 is a schematic diagram depicting various components of an exemplary gas separator apparatus of the present disclosure.

FIG. 2 is a schematic diagram of the separator assembly 100 and various air separator assembly components of the present disclosure. In an example, a compressed air single stage or multi-stage desiccant filter 130 is provided with an inlet 128 for filtering compressed inlet air, such as for filtering or drying moisture from the inlet compressed air. In an example, the desiccant filter is available from Parker Filter Model 8003N-1A1-BX. The inlet compressed air is then processed by the separator assembly 100 to produce a nitrogen stream and an oxygen stream, as further discussed below. In other examples, nitrogen from a nitrogen source, such as from one or more nitrogen tanks, can be directed through the filter 130 and through the separator assembly 100 for further enhancement or purity at one of the outlets. Alternatively or additionally, nitrogen tanks are routed through the assembly 100 for purposes of regulating and controlling the various outlet streams at the assembly outlet, such as to control the application manifolds 400, 440 to simultaneously inflate multiple automobile tires, as further discussed below. The outlet gas streams from the assembly 100 may be used for any number of purposes, applications, and industries, including for filling automobile tires, for medical use, for inert gas, for purging, etc.

In an example, the separator assembly 100 is rated for use with an inlet compressed gas source of between about 110 psi to about 200 psi with about 140 psi to about 180 psi being more preferred. Generally speaking, the higher the CFM flow rate of the inlet compressed gas and the higher the pressure, up to about 200 psi, the quicker the separator assembly can generate nitrogen and oxygen streams. However, the system can be configured to operate at a much lower pressure, such as in the order of about 75 psi to 110 psi, or a much higher pressure, such as in the order of about 200 psi to about 250 psi.

The filter 130 can comprise any number of commercially available desiccant filters having means for removing dirt, debris, particulates, oil, and water from the compressed air stream and is rated for the inlet pressure. In an example, a one way check valve 136, such as from McMaster-Carr part No. 7768K22, can be connected to the filter outlet 134 and then the outlet from the filter 130 connected to the inlet 102 of a manifold 140. As the filter inlet 128 provides the inlet to the separator assembly 100, the filter inlet 128 may also be considered or called an assembly inlet 102. In an example, the manifold 140, or first manifold 140, is a 1×2 manifold. That is, the manifold 140 has one inlet and two outlets. In other examples, the manifold configuration can be different, such as a 1×1 manifold, a 2×2 manifold, a 1×3 manifold, or any number of inlet to outlet configurations. Any of the inlets and/or outlets can be plugged or capped or be connected to a supply source or a receiving source. As shown, one of the outlets 142 of the manifold 140 can be connected to an analog and/or a digital gauge, which can be displayed at the control panel 120, and another outlet 144 is connected to a second manifold 150, which is available from Automatic Valve and having part number L2004AAWR-DA 2-3 way Valve Electronic 12 Volt. A one way check valve can be used with any of the ports 102, 142, 144. Optionally, one or more control valves, such as switch valves or solenoid valves, can be used with any of the ports.

In an example, one of the outlets 140, 142 from the first manifold 140 is connected to a regulator and calibration system 200 to calibrate the incoming oxygen and/or nitrogen level of the feed stream. Optionally, the outlet stream 140 or 142 from the first manifold 140 may also be routed to a moisture analyzer or sensor to determine the moisture content of the compressed inlet gas. Preferably, the moisture content is about 1.3% to about 2.5%.

As shown, the regulator and calibration system 200, which may also be referred to as an RC system 200, comprises an inlet switch valve 202, which is connected to an RC manifold 204, and a control valve 206. Both switch valves 202 and 204 are available from Humphrey 320 12 VDC-3 way incline valve, ¼" port direct act. The RC manifold 204 can have a number of ports to enable control of multiple streams passing through, such as in and out, the RC manifold 204. For Example, the RC manifold 204 can have a body with one inlet and two outlet ports so that a compressed gas inlet stream, such as a pressurized nitrogen stream from the application manifold 400, can split into two or more streams for further processing, such as to sample for nitrogen content, pressure reading, and/or moisture content. A pressure sensor from SMC, P/N PSE540-N01 and pressure transducer from Honeywell, P/N 480-6705-ND may be used to read pressure throughout the system 100. The pressure transducer can be mounted to the storage tank 340.

The inlet and outlet ports of the RC manifold 204 can be equipped with block valves, controllable switch valves, spring loaded check valves, and/or orifices to direct flow in and out of the manifold. As shown, a pressured gas stream from the application manifold 400 can flow through the RC manifold 204 and then the manifold split the streams to flow into the inlet of switch valve 202 for sensing at least one of O2, N2, moisture, etc. and another stream to the controller 120 to display pressure, as an example. Discharge from one of the assembly outlets 104, 106 can also be directed to the RC manifold 204 for sending to the controller, as further discussed below.

The control valve 206, which can be a switch valve or a solenoid valve that can be actuated by a controller to open or close to permit or block gas flow, is configured to discharge gas to a pressure step-down regulator 208 to reduce the gas pressure down to about 0.5 psi to about 2.5 psi. Discharge from the pressure regulator 208, for example 1 psi, is then sent to an O2 sensor 210 located in a manifold 216 to sense the oxygen content of the gas stream. The manifold 216 can include a port equipped with an orifice to allow gas to vent. The orifice can be sized to about 20 thousandths to 40 thousandths to maintain an adequate back pressure. The O2 sensor 210 is available from Infrared Industries Inc., P/N Class R-22 air oxygen sensor. Optionally, an in-line orifice may be used upstream of the pressure regulator 208 to reduce the incoming pressure to the pressure regular. Output from the O2 sensor 210 is then wired to the control housing 120, which processes the information, such as resistance or voltage readings or values, and converts the data to show nitrogen purity in percentage values, based on the ratio of oxygen to nitrogen in air. In an alternative embodiment, a nitrogen sensor is used instead of the oxygen sensor 210 to directly measure nitrogen content in the gas stream. In still other examples, both an O2 sensor and a N2 sensor are used to separately sense oxygen and nitrogen molecules in the gas stream and then displaying both values. The values, in percent oxygen and percent nitrogen can be displayed on the controller box 120. In an example, a moisture sensor 218 may be connected to the manifold 216 or in a separate mounting body for sensing humidity or moisture content of the gas stream. When incorporated, the moisture sensor 218 is available from Honeywell, P/N H1H6131. In an example, the same moisture sensor 218 can also read humidity and be displayed on the control panel.

In an example, the second manifold 150 is a 3×2 manifold. That is, the second manifold 150 can comprise three inlets and two outlets. At least one of the inlets can be used to receive the compressed gas from the first manifold 140, which can be compressed air or compressed nitrogen from a nitrogen source. One or both of the other inlets can be plugged or capped off or can alternatively be used for sensing the air stream, the moisture content, oxygen molecule content, etc. The two outlets 152, 154 can each be connected to a control valve, such as a switch valve or a solenoid valve. In an example, the two valves can comprise a general purpose 2-way solenoid valve operable on 12 VDC. The power can be from an on-board battery power that is rechargeable or from 120 VAC or 240 VAC utility power that is then converted to DC power. In other examples, the various control valves can be selected to operate on different power input, such as 24 VDC.

A controller 160 and mother board 162, including storage, a PCB with I/O and comm ports, Blue Tooth connectivity, WiFi capability can be incorporated with the system and can be located inside the control housing 120. The controller can selectively control or activate which of the two valves at the two outlets 152, 154 of the second manifold 150 to open to then permit compressed gas to flow into either a first charging tower 170 or a second charging tower 172, each housing a quantity of carbon molecular sieve (CMS) absorbents or elements. The controller 160 and mother board 162 can store any of the values read during any service procedure, such as N2 percentage, O2 percentage, pressure readings, moisture readings, temperature readings, elapsed time, fill time, etc., and can send or deliver the data to the Cloud for additional processing. The stored data can also be uploaded to a computer or a smart phone for viewing and analysis. Authentication and security measures can be implemented to initiate the separator system 100, access data, send/receive data, etc.

In an example, the CMS absorbents are selected to absorb oxygen molecules within the pores of the elements but not nitrogen molecules. Thus, nitrogen is separated from the oxygen molecules and are allowed to pass through to the storage tank 340, if meets the nitrogen purity set point, or purged to atmosphere.

In an example, the two charging towers 170, 172 are pressured metallic canisters each comprising a body 174, a first end 176, and a second end 178. In an example, the body 174 can be an extruded pipe or pipe section. The two canisters or towers 170, 172 can have the same size or volume, such as having the same body shape, and can be rated the same, such as having the same pressure operating range, same attached ports or nozzles, and same closure caps, panels or flanges for closing and opening to access the interior of each respective tower. In other examples, the two towers are different.

In one example, the closure panels or caps on each of the two charging towers 170, 172 are threadedly connected to the body 174 of the vessel or tower to enclose the ends of the towers. In other examples, each closure panel is connected to the body 174 of the vessel or tower by bolt connections having a gasket or a seal between two flanges, similar to bolted flanges. Other conventional attachment means between the body of each canister and a cap are contemplated for opening and accessing the charging towers, such as for filling, changing, or adding CMS absorbents or elements. In still other examples, a bottom end cap for enclosing a bottom of each tower is welded to the body 174 while an upper end cap is bolted to the upper opening of the body 174, as further discussed below.

With further reference to FIG. 2, in an example, each charging tower can be formed from a section of an extruded pipe 174 having two open ends. In an example, the extruded pipe 174 is made from aluminum having a thickness and hoop strength that is rated for servicing the desired operating pressure range. A first plate having an inlet may be used to enclose one of the ends of the pipe 174 and a second plate may be used to enclose the second end of the pipe 174, which can also be used as a cap to access the interior of the pipe 174 for filling and servicing the towers. In an example, a bottom end cap is welded to the bottom opening of each extruded pipe 174. In an example, a singularly formed upper cap can be sized and shaped to enclose the open ends of both extruded pipe sections 174, 174, as further discussed below. The singularly formed upper can be integrated with flow channels for gas outlet flowing out of the two towers, as further discussed below.

Figure 3:
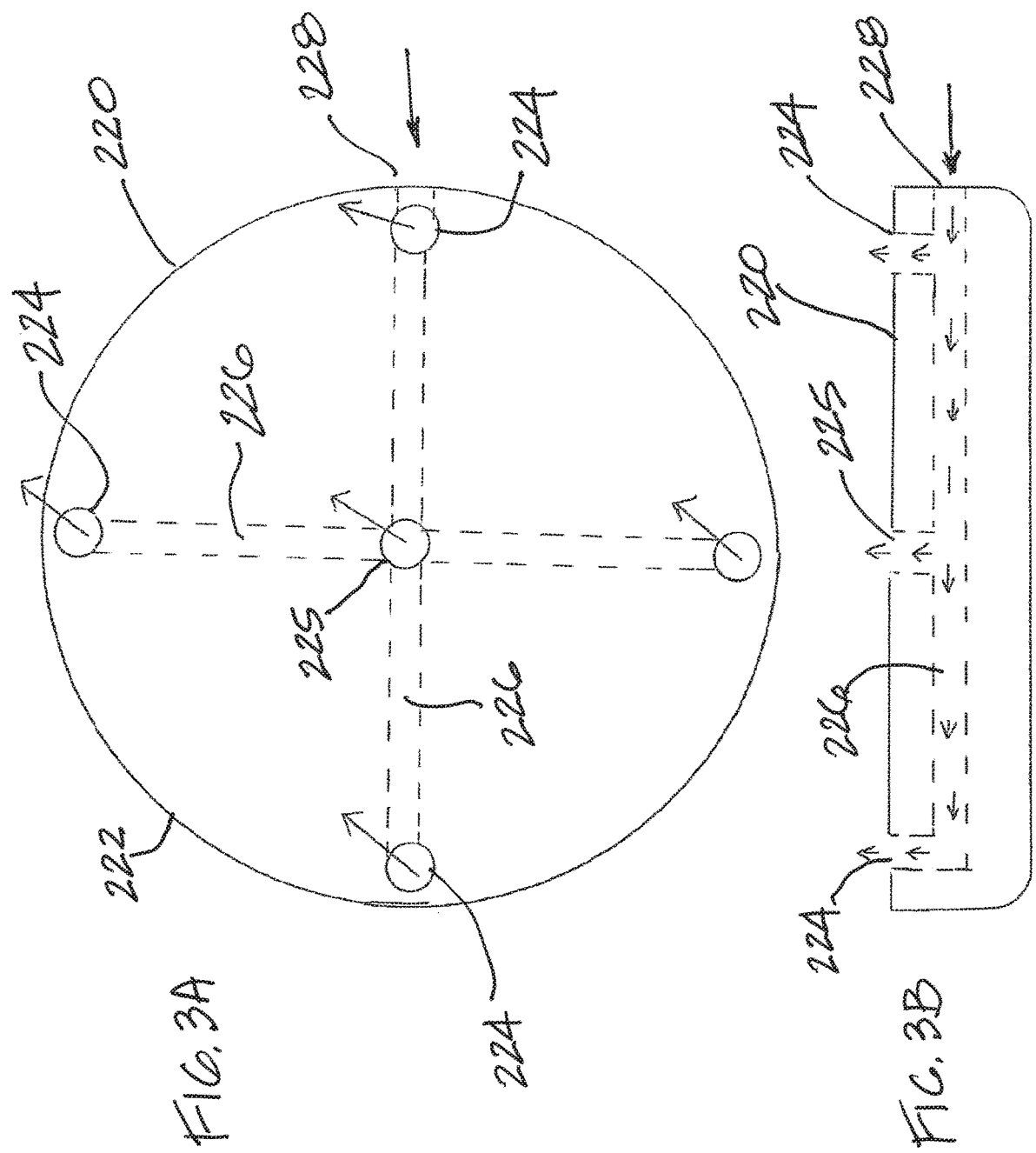
FIGS. 3A and 3B depict a top view and a cross-sectional side view, respectively, of an end plate.

With reference now to FIGS. 3A and 3B, which show a top view and a cross-sectional side view, respectively, of an exemplary end cap 220 for closing a lower end of an extruded pipe to form one or both charging towers 170, 172 of the present disclosure. In an example, the end cap 220 is made from a round metallic plate, such as a round aluminum plate, with a desired thickness sized for the operating pressure range of the separator assembly 100. The end cap 220 has a perimeter 222 and a plurality of flow holes 224 recessed inwardly from the perimeter. The end cap 220 can be welded to the bottom opening of the extruded pipe.

In an example, as shown in FIG. 3B, the plurality of flow holes 224 are interconnected, such as being in fluid communication with one another. The flow holes 224 can connect via one or more sub-surface flow paths 226 that are machined into the wall thickness of the end plate. One or more entry openings 228 from a side of the end plate 220 may be made, such as machined, to form the sub-surface flow paths. As shown, two entry openings 228 are machined into the thickness of the end plate to form the "X" shape sub-surface flow paths 226 that intersect one another. The side entry openings 228 may subsequently be used to receive inlet compressed gas, such as inlet compressed air. Un-used side entry openings 228, if any, may be plugged or sealed off, such as with a plug or screw. In an example, a matching hole is machined through the side of the body 174 and aligned with one the side entry openings 228. Thus, when the end cap or end plate 220 is seated at the open bottom end of the body 174, the hole machined through the side of the body 174 and one of the side entry openings 228 align. The side opening of the body and the aligned side entry opening 228 of the end plate 220 can receive gas flow from the second manifold 150 and the gas is then permitted to flow through the plurality of flow holes 224 via the sub-surface channels 226. The other side entry opening 228 for machining one of the sub-surface flow channel 226 can simply be butted up against the interior side surface of the pipe section 174. The end plate 220 is then welded to the body 174 to enclose the bottom end of the tower. In other examples, the end plate 220 is bolted to the body 174.

As shown, four flow holes 224 are provided adjacent the perimeter 222 of the end plate 220 and one central hole 225 is provided at an intersection of at least two sub-surface flow paths or channels 226. In other examples, more than or fewer than four holes can be incorporated and additional inwardly positioned holes may be machined and connected to the sub-surface flow paths 226. In other words, there can be more than one flow hole 224 in communication with one of the branches of the sub-surface flow paths 226. The plurality of holes allow inlet compressed air flowing into the aligned holes of the body 174 and the side entry hole 228 of the end plate 220 to be distributed across the cross-sectional area of the extruded pipe 174 so as to more efficiently interact with the CMS absorbents, as further discussed below. In another example, a single through hole is provide through the body of the end plate 220 and a header made from tubing or piping is connected to the single through hole to provide distributed flow paths for the inlet compressed gas. For example, an X-shape manifold can be provided at the upper surface of the end plate and in fluid communication with the single hole machined through the end plate to provide a plurality of spaced apart flow holes formed through the X-shape manifold for air flow.

Figure 4:
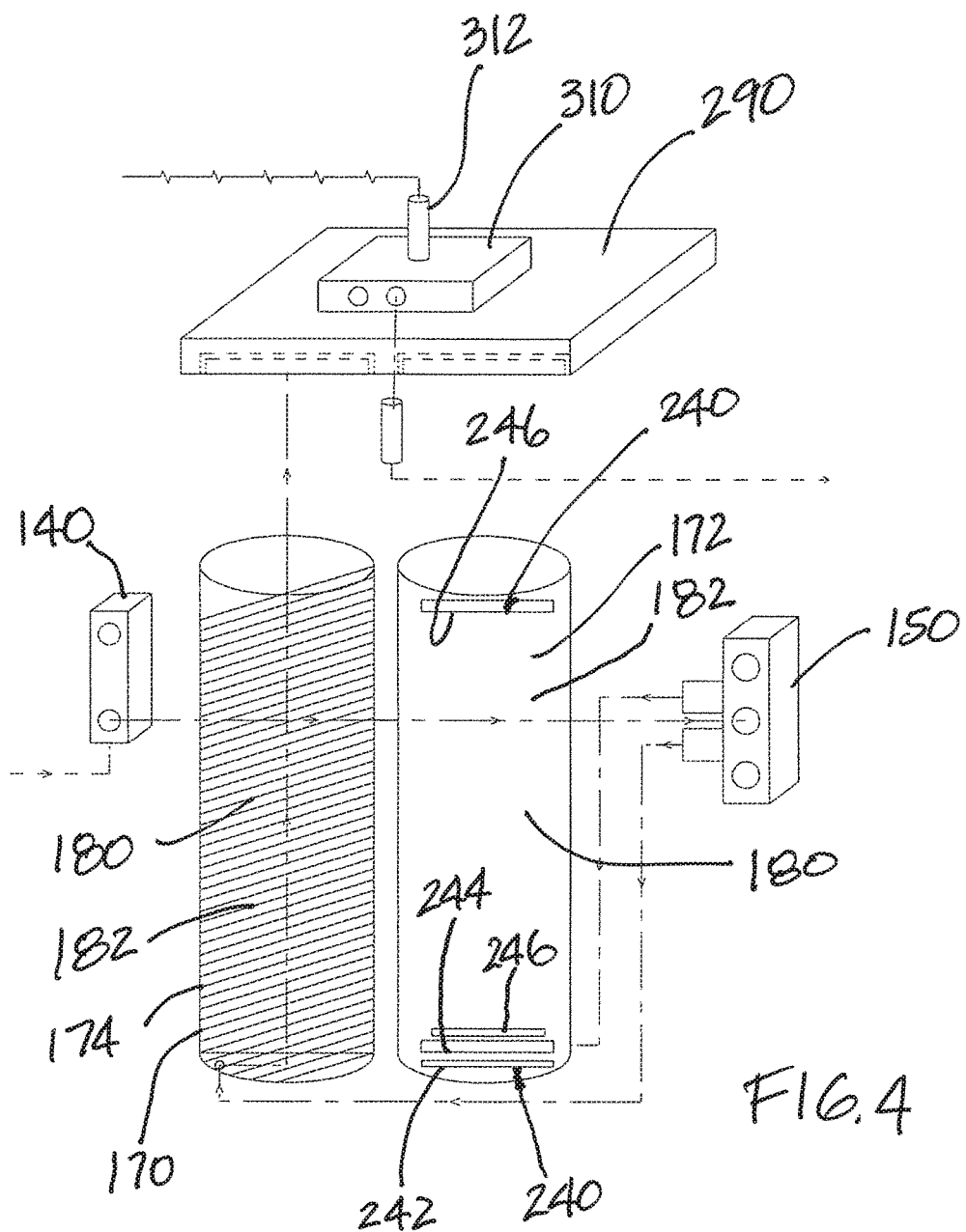
FIG. 4 is a close up view of some of the components of FIG. 2.

With reference now to FIG. 4 in addition to FIG. 2, the interior 180 of each charging tower comprises a plurality of carbon molecular sieves absorbents 182 located on a screen structure 240, which is placed over the end plate 220 and covers the plurality of flow holes 224 on the end plate. The screen structure 240 is configured to prevent the CMS absorbents from falling into the flow holes 224 and possibly clogging the holes and/or the sub-surface flow paths 226. Alternatively or additionally, the screen structure 240 can break up the gas flow flowing upwardly out from the plurality of flow holes 224 on the end plate 220 to disperse the gas as it rises through the column of CMS absorbents 182.

In one example, the screen structure 240 comprises two separate screen layers 242, 244. The first lower screen layer 242 can comprise an aluminum screen in contact with the end plate 220. The lower screen layer 242 can be made from fine aluminum mesh with thickness, formed from multiple layers or from one layer, of about 1 to 2 mm thick. The mesh size can be in the order of 0.5 to 2 millimeters or of micron size. The mesh size should be smaller than a CMS element to prevent the CMS element from passing therethrough. The second layer 244 located above the first layer 242 can comprise ¼ inch thick Scott-bride maroon color nylon pad from McMaster-Carr having very fine mesh pad with aluminum oxide imbedded therein. In some examples, the first layer 242 directly contacts the end plate 220 and the second layer 244 directly contacts the first layer. Other screen layers having the appropriate mesh size are contemplated for use with the present assembly including for use with the screen structure 240. For example, a third filter 246, such as a felt sheet, having a 100 micron to 200 micron size can be placed on top of the second layer 244 to further minimize the likelihood of any CMS element possibly falling into the flow holes 224. The felt mesh filter layer 246 can also assist in dispersing gas flow rising out from the end plate 220 and flowing upwardly towards the outlet end plate. The third filter layer 246 is available from McMaster-Carr and can be a very soft gray F13 felt. The felt layer can assist to filter any grease or oil in the gas streams.

The two charging towers 170, 172 can each stand about 30-inches to about 84-inches tall and can have a diameter of about 4-inches to about 10-inches. In other examples, depending on the quantity of CMS absorbents used and therefore the gas separation capacity of the separator assembly 100, the tower size can differ, such as being taller, shorter, wider, or narrower, etc.

In an example, a second set of screen structure 240 is placed at the top of each stack of CMS absorbents 182, at or near the upper end 176 of the tower, in each charging tower to prevent or limit unwanted carryover flow of the CMS absorbents 182 out the discharge port or ports of each tower. In a particular example, each upper set of screen structure 240 can be the same as the lower screen structure 240. In alternative embodiments, the upper and lower screen structures can be different, such as having different mesh sizes, different mesh materials, etc. For example, the upper screen structure located above the stack of CMS elements 182 can be a single felt mesh filter layer 246 only, without any other screen layer. Each screen structure 240 can optionally be packaged in a cage or frame for convenient handling of the multi-piece structure as a single integrated unit. In one example, the upper screen structure 240 near the outlet can be fastened or secured to the outlet end plate. This can ensure proper positioning of the upper filter and can screen or block out CMS elements from being displaced out the tower via the one or more outlet ports. In an example, the screen structures have 240 a circular or rounded perimeter and can fit within the interior of the tower in a snug or size-on-size fit. In another example, part of the perimeter of the screen structure 240 can abut or be folded so that the perimeter can push against the interior of the pipe section 174 of the tower and face upwardly or downwardly. The screen structures 240 can either float within the interior 180 of the towers or can be tied or secured within the interior.

Each charging tower 170, 172 can be filled with CMS absorbents 182 by first placing the lower screen structure 240 over the lower end plate 220 or over the bottom of each respective body 174. Then a first pour of the CMS absorbents 182 is directed or placed inside the tower to a filled level. In one example, the pour into the tower can be performed manually using a scoop or a scooper and then filling the tower to a desired filled height or filled level with CMS absorbents 182. In other examples, a dispensing system can be provided to automate the filling process. The dispensing system can include a silo or storage vessel for storing bulk CMS absorbents, belts, rollers, and dispensing components for transferring some of the bulk CMS absorbents into the charging towers.

In some examples, a settling device is used to pack and settle the CMS absorbents or elements 182 inside the charging towers. For example, a movable plate or platform may be placed in contact with a charging tower to be filled and the charging tower is moved by the movable plate or platform during filling to facilitate packing the CMS elements inside the charging tower. In some examples, the charging towers can be shaken by hands to pack the CMS elements. In other examples, a slow moving belt is wrapped around the charging tower and moves the charging tower as it is being filled. In still other examples, a base that vibrates or shakes is used to move the charging tower during filling to pack the CMS elements 182 into the tower. Thus, an aspect of the present disclosure is understood to include a charging tower having a first closed end and a second end that is sealable with a removable cap and wherein the charging tower is filled with CMS elements 182 that have been packed into the interior of the tower by shaking, agitating, vibrating, or combinations thereof. In an example, the packed CMS elements 182 are located between a first set of screen structure 240 and a second set of screen structure 240.

In yet other examples, an impact device for imparting an impulse is used to pack the CMS elements 182. The settling step to pack the CMS elements 182 can be performed during the filling step, after the filling step, or both.

In one example, after the CMS elements 182 are filled to a desired filled level inside the charging tower, an impulse is imparted to the charging tower to allow the small CMS elements to settle and pack within the charging tower. In some examples, the settling step can last for the duration of time that it takes for the CMS elements to visually decrease or shorten in height within the charging tower, which is indicative of the CMS elements packing into the charging tower during the impulse generating step.

After the CMS elements settle following the first pour into the charging tower and following the settling step, the column height of the CMS elements from the first fill or first pour reduces from the filled level to a first packed level. A second pour of CMS elements 182 can be added to the charging tower to bring the CMS stack height to the filled height or level, such as to top off the tower from the first packed level with additional CMS elements. The charging tower is then packed again by shaking, agitating, vibrating, inducing impulses to the tower or combinations thereof. This brings the CMS elements filled level back down to a second packed level, which is higher than the first packed level but lower than the filled level. The process is then repeated until the level of packed CMS elements does not substantially drop below the filled level following the packing or settling step. In practice, it has been found that 4 to 7 pours in combination with shaking, agitating, vibrating, inducing impulses to the tower or combinations thereof to pack the CMS elements 182 may be employed to ensure a properly packed charging tower filled with CMS absorbents 182. Thus, the filling and settling process can produce the following sequence: CMS element filled level, first packed level, CMS element filled level, second packed level, CMS element filled level, third packed level, CMS element filled level, fourth packed level, etc., up to about a seventh packed level. In an example, a fifth packed level is within 1-inch of the CMS element filled level. In an example, a sixth packed level is within 1-inch of the CMS element filled level. In an example, a seventh packed level is within 1-inch of the CMS element filled level. In an example, an eight packed level is within 1-inch of the CMS element filled level. In other examples, the fifth, sixth, seventh, or eight packed level is within 1-inch of the CMS element filled level.

Each subsequent fill of CMS elements can also or alternatively be measured in pounds of CMS elements added to the charging tower to a CMS element filled level. In an example, each subsequent CMS fill step after the first pour decreases in weight following the first filled step. For example, the first pour can require 14 pounds of CMS elements to fill to a CMS element filled level. Then after the settling step, the tower can require an additional 1.75 pounds to refill the tower with CMS elements to the CMS element filled level. Then upon further compacting the CMS elements, the next pour can require an additional 1.25 pounds to fill the charging tower to the CMS filled level. Then the next pour can require an additional 0.75 pound and possibly one additional pour of yet another 0.25 pound to fill the charging tower to the CMS filled level.

In an example, the number of re-pours to fill the charging tower to the desired level or to the CMS filled level when the CMS elements are packed is the number that corresponds to a re-pour of 0.5 pound or less or to a height that is within 1-inch or less of the CMS filled level. In other examples, the charging towers can be over-sized and the pounds of CMS elements and/or height that is within the CMS filled level can vary.

Alternatively and less preferred, the charging tower may be used after the first pour without any or without the multiple packing and settling steps. In some examples, the charging towers are over-sized for an intended application so that the CMS elements 182 may be placed therein without having to pack the elements with multiple discrete pours and multiple settling steps.

In an example, an impact element, such as a billet, a metal stock, or a metal bar, which can be coated or covered with a non-metallic coat, such as a rag, a towel, a polymeric jacket or cover, can be used to impart an impulse to the charging tower during the pouring step, after the CMS elements have been poured into the tower to pack the CMS elements, or both. The impact element can impart about 50 blows to about 200 blows to the tower to settle the CMS elements inside the charging tower for each discrete pour. In some examples, the number of blows can range from about 120 to about 140. In other examples, the number of blows to impart impacts to the towers and settle the CMS elements, such as to pack the CMS elements, can be measured in time, such as about 5 minutes to about 10 minutes at slow, moderate, or fast impacts.

Where a movable device is used for the settling device, such as a belt or a vibratory plate or base is used, the settling device should be controlled to induce or introduce intermittent shaking or moving forces on the charging tower to be filled. By intermittently inducing a force on the charging tower to move the tower and the CMS elements located therein, the elements have opportunities to settle rather than continually shift with a continuous force inducing source.

With further reference to FIG. 2 and FIG. 4, after the separator assembly 100 undergoes the calibration procedure, a signal can be displayed on the control housing 120 to indicate whether the assembly is ready to continue or an error has been detected following the calibration. Other information may be displayed at the same time at the start of the process, such as the model type or size, temperature readout, error code readout, etc. If the assembly 100 is ready to begin, such as following a positive calibration, the user can be directed to push the start button or switch to begin producing nitrogen gas. In one example, an LED light is associated with a start button to indicate where to press to initiate the process. If the user hits the start or charge switch on the control panel 120, the assembly will begin to direct compressed air via the filter 130, the first manifold 140, and the second manifold 150, through the first charging tower 170 to begin separating the compressed air stream to produce pressurized nitrogen gas and/or pressurized oxygen.

As pressured air enters the interior of the first charging tower 170 through the plurality of flow holes 224 on the end plate 220 (FIGS. 3A and 3B), the relatively smaller size oxygen molecules are collected inside the pores of the carbon molecular sieve elements 182 while the relatively larger size nitrogen molecules flow through the bed of CMS elements and accumulate in the first charging tower 170. In an example, nitrogen produced in the tower 170 can discharge directly out the outlet of the tower without accumulating, except for possibly due to system back pressure. The mechanisms that CMS elements employed to separate oxygen molecules and nitrogen molecules from an air stream are well known in the art and will not be discussed herein.

In an example, the stream of compressed gas is allowed to travel through the bed of CMS elements and exit out an outlet port at the top of the charging tower 170 and into flow channels of an outlet manifold 290. As previously described, the direction of gas flow into either the first charging tower 170 or the second charging tower 172 is controlled by the second manifold 150, which has switches that are controllable by the controller 160. Thus, when one tower is being charged with compressed air, such as tower 170, the other tower, such as tower 172, is allowed to exhaust to the atmosphere through the same 3×2 second manifold 150, as further discussed below.

With reference now to FIG. 5, a schematic diagram of the outlet manifold 290 is shown with a schematic depiction of the first and second charging towers 170, 172 located below the manifold to show the towers' interactions with the outlet manifold 290. The manifold 290 can be considered a top end plate with flow channels incorporated therewith. That is, the manifold can comprise a body or plate 70 having a lower surface facing the towers 170, 172 and an upper surface facing away from the towers and a thickness therebetween. Two grooves 72, 72 are provided on the lower surface for mating against the upper openings of the two towers 170, 172, preferably with a gasket or O-ring located between each tower and the plate 70. The plate 70 has a perimeter 76 that can be provided with bolt holes for use to bolt the upper plate 70 to the two towers 170, 172. The bolts allow the plate 70 to be removable from the two towers to access the interior of the towers, such as to load the towers with CMS elements 182.

In an example, at least one outlet port 170a, 172a is formed inside the boundary defined by the two grooves 72, 72. For example, one or more than one outlet ports can be provided within each groove boundary 72. Nitrogen generated inside the two towers can exit the towers via the outlet ports 170a, 172a and then pass through flow channels to be directed elsewhere, such as to a storage container or to an end receiving device, such as automobile tires.

Flow paths or channels 292, 294, 296 are formed in the manifold 290, such as machined into the thickness of the plate 70. Entry points into the plate 70 to create the flow paths 292, 294, 296 can be plugged off using a threaded plug and the like. The flow paths or channels 292, 294, 296 are in fluid communication with the two outlet ports 170a, 172a, or to additional outlet ports if incorporated. In one example, the two discharge flow paths 292, 294 are not in fluid communication with one another such that exhaust stream from each charging tower flows directly into a secondary outlet manifold 310 without mixing. As both towers 170, 172 are connected to the primary and secondary flow paths, a control valve 312 located with the secondary outlet manifold 310 and/or in the common discharge line 296 can be incorporated to direct flow, as further discussed below. The control valve 312 is available from IMI Norgen, electric switching valve P/N 261115-1/8 orifice, 12 Volt VDC MOPD 150. In other words, the two discharge flow paths 292, 294 can be isolated from one another by providing a blockage somewhere in the common discharge line 296, such as a plug or a solid surface at point 298, which can be located at any number of locations along the common discharge line 296.

In an alternative embodiment, the two discharge flow paths 292, 294 are in fluid communication with one another by providing a flow path through point 298. In one example, a flow through 300, such as a control valve, is provided at point 298 to enable control of when the two discharge flow paths 292, 294 fluidly communicate with one another. The control valve 300 can be wired to the control housing 120 so that the controller 160 can control when to energize and de-energize the valve for fluid communication between the two discharge flow paths 292, 294 via the common discharge line. In other examples, the flow through 300 can embody an orifice so that the two discharge flow paths 292, 294 are in constant fluid communication with one another. When provided with an orifice instead of a control valve for the flow through 300, the orifice size can be around 3 thousandths to 20 thousandths of an inch in diameter. In some examples, the orifice can have a smaller range of about 3 to 10 thousandths of an inch.

Again assuming a scenario in which the first charging tower 170 is first provided with compressed air from the second manifold 150, nitrogen discharges out the first charging tower 170 via the outlet port 170a into the first discharge line 292 of the outlet manifold 290 and into the common discharge line 296, which connects the two discharge lines 292, 294 if a flow through 300 is provided, such as with an orifice or a switch valve. The discharge flow, which has a high concentration of nitrogen molecules, then enters a first discharge channel 314 located between the discharge manifold 290 and the secondary outlet manifold 310. A spring loaded check valve 316 can be provided in the first discharge channel 314, which permits gas flow to flow out the secondary outlet manifold 310 from the discharge manifold 290 but not from the secondary outlet manifold 310 back into the charging tower 170. Concurrently, if a flow through 300 is provided, such as an orifice or a control valve, high concentration nitrogen molecules can flow through the flow through 300 located in the common discharge line 296 and into the second charging tower 172 via the discharge line 294 to provide the second charging tower 172 with nitrogen molecules while the charging tower 172 seats idle or is in purging mode to purge oxygen out to the atmosphere via the second manifold 150, as further discussed below.

In an example, the secondary outlet manifold 310 comprises three outlets 320, 322, 324. Outlet 320 can be equipped with an orifice to provide back pressure to the assembly 100. The orifice at outlet 320 can have a diameter of about 10 thousandths of an inch to about 30 thousandths of an inch. Alternatively, a control valve, such as a switch valve or a solenoid valve, may be used to selectively open or close outlet 320.

Outlet 322 is controlled by a control valve 312. Functions of the control valve 312 are further discussed below.

Outlet 324 can be directed to the regulator and calibration system 200 and particularly to the O2 sensor 210 to sense the oxygen molecule content in the stream, which can be converted to nitrogen value through known oxygen to nitrogen ratio. In an example, if the nitrogen molecule content in the stream is at least 98.2%, as an example, the control valve 312 in the secondary outlet manifold 310 can be activated to allow the highly concentrated nitrogen stream to flow to the storage tank 340 (FIG. 2). If the value is below the 98.2% set point, the control valve 312 can remain closed and instead the second manifold 150 is activated to purge the contents of the first charging tower 170 and switches direction to begin charging the second charging tower 172 while the first charging tower 170 purges to atmosphere, as further discussed below. The set point for the nitrogen stream can be adjusted to a higher value than 98.2%, such as up to about 99.8%, before the stream is routed to the storage tank 340.

Figure 5A:
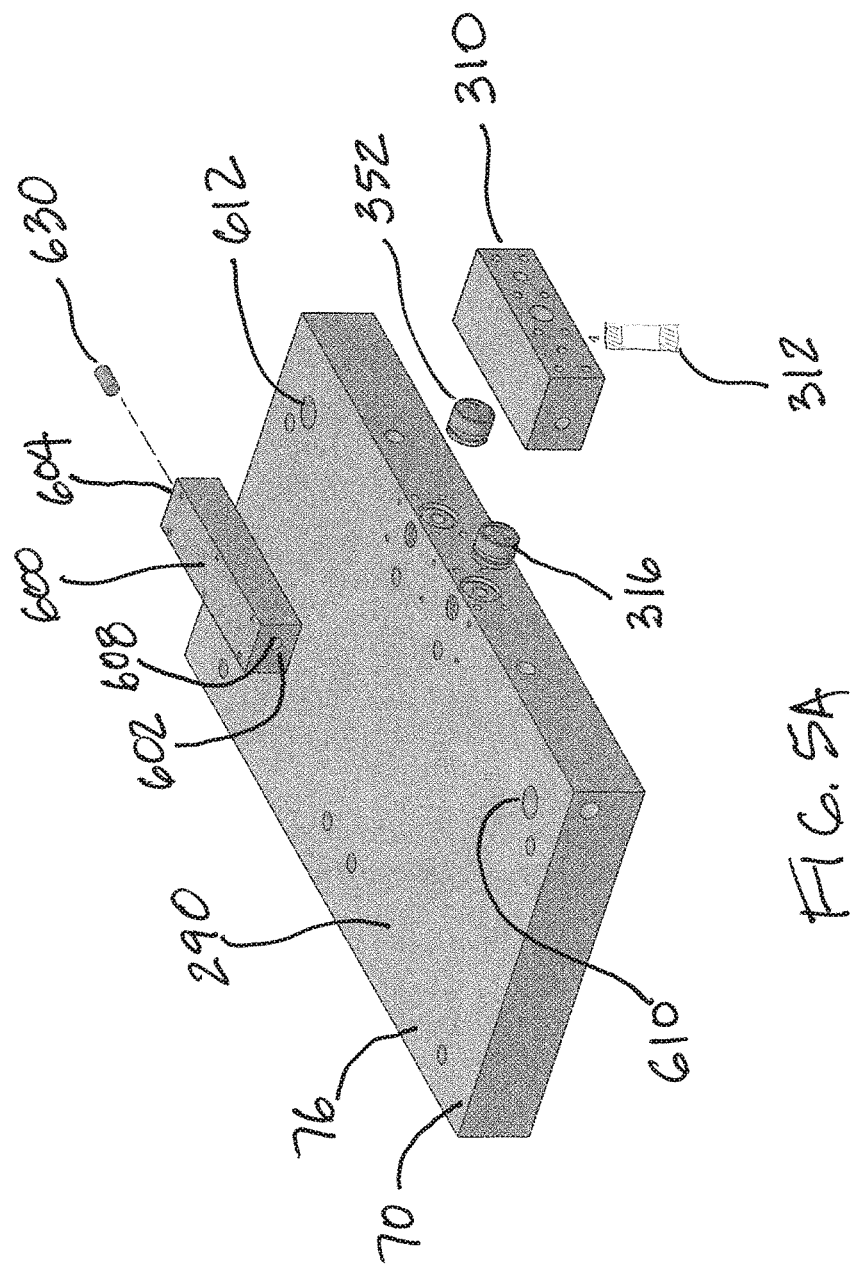
FIG. 5A is a schematic perspective view of an outlet manifold for directing outlet gas streams.

With reference to FIG. 5A, a schematic perspective view of an exemplary outlet manifold 290 is shown, which can be similar to the manifold described with reference to FIG. 5. As shown, the body 70 has a plurality of bolt holes for receiving bolts or screws for mounting the body 70 to the two charging towers 170, 172, as discussed with the embodiment manifold of FIG. 5. Also shown is the secondary outlet manifold 310 for connecting to the primary outlet manifold 290. The two check valves 316, 352 are shown between the primary and secondary manifolds 290, 310.

In the present embodiment, point 298 inside the primary outlet manifold 290 (similar to point 298 in FIG. 5) in the common discharge line 296 inside the primary outlet manifold 290 is blocked. To allow the two discharge flow paths 292, 294 (similar to flow paths in FIG. 5) inside the outlet manifold 290 (FIG. 5A) to be in fluid communication, a bypass header 600 is provided, which can be mounted to the upper surface 76 of the body 70. The bypass header 600 has a through bore 608 located between two end openings 602, 604. Port 610 and port 612, which are connected to flow channels 292 and 294, respectively (similar to flow paths in FIG. 5), can connect to the two end openings 602, 604 thereby allowing flow channels 292 and 294 to be in fluid communication with one another despite being blocked at point 298 (similar to point 298 in FIG. 5).

The bypass header 600 allows for restriction device 630 to be placed inside the bore 608. The restriction device 630 can be a nipple or a solid washer and machined or drilled with a desired orifice opening, such as about 3 thousandths to about 20 thousandths. The two flow channels 292, 294 inside the primary outlet manifold 290 can therefore be in fluid communication with one another via the bypass header 600, which can include a restriction device 630 having an orifice.

In still other examples, rather than a single unitarily formed primary outlet header, a bypass header, and a single unitarily formed secondary outlet header, multiple end plates and headers can be incorporated and connected to one another via tubing, fittings, valves, etc. For example, the primary outlet manifold 290 of FIG. 5A can be made from two separate end plates each with a groove for mounting to a respective charging tower and each with flow channels that can connect to the other separate end plate using fittings and tubing.

In other examples, additional pairs of charging towers can be included to increase the nitrogen and/or oxygen production capacity of the separator assembly. For example, the assembly can include six charging towers or more, or three pairs of towers that can be used to charge and purge. The three pairs of towers can operate in parallel or serially using the principles described herein.

If the nitrogen reading is at least 98.2%, or at some other set point that can be adjusted at the control housing 120, then the control valve 312 can be activated to permit flow to flow through the control valve and out the outlet 322 to then fill the nitrogen storage tank 340. The flow can continue out the control valve 312 until the nitrogen purity reading from outlet 324 to the RC system falls below the set point. In some examples, the set point can be adjusted to 80% nitrogen level or higher. For example, for medical or scientific applications, the nitrogen set point can be set to 99.3% before the nitrogen is permitted to exit the outlet 322 through the control valve 312. For school or education applications, a lower reading, such as 85% may be sufficient. For other applications, such as for filling automobile tires, the set point can be set to about 98.2% or higher. Other values for other applications and industries are contemplated, including food, cosmetic, aerospace, manufacturing, marine, agricultural, oil & gas, chemical plants, automotive, etc.

With further reference to FIGS. 4 and 5, if the nitrogen level detected out the outlet 324 of the secondary output manifold 310 falls below the set point, such as when the system is first initiated or after drawing down nitrogen from the same first tower 170 for some period, then the controller 160, which can be a micro-base controller and control board, switches the tank to be charged. In an example, the two control valves at the second manifold 150 (FIG. 4) are activated so that discharge flow out the second manifold is now directed to the second charging tower 172 and pressure in the first charging tower 170, which has residual nitrogen content that have fallen below the set point, is allowed to purge out the second manifold 150.

With reference now to FIG. 4A, a schematic diagram of the second manifold 150 is shown. The second manifold 150 comprises a body or housing 500 with five different ports, including two discharge ports 152, 154 for filling the charging towers 170, 172, an inlet port 502, and two purge ports 504, 506.

Figure 4B:
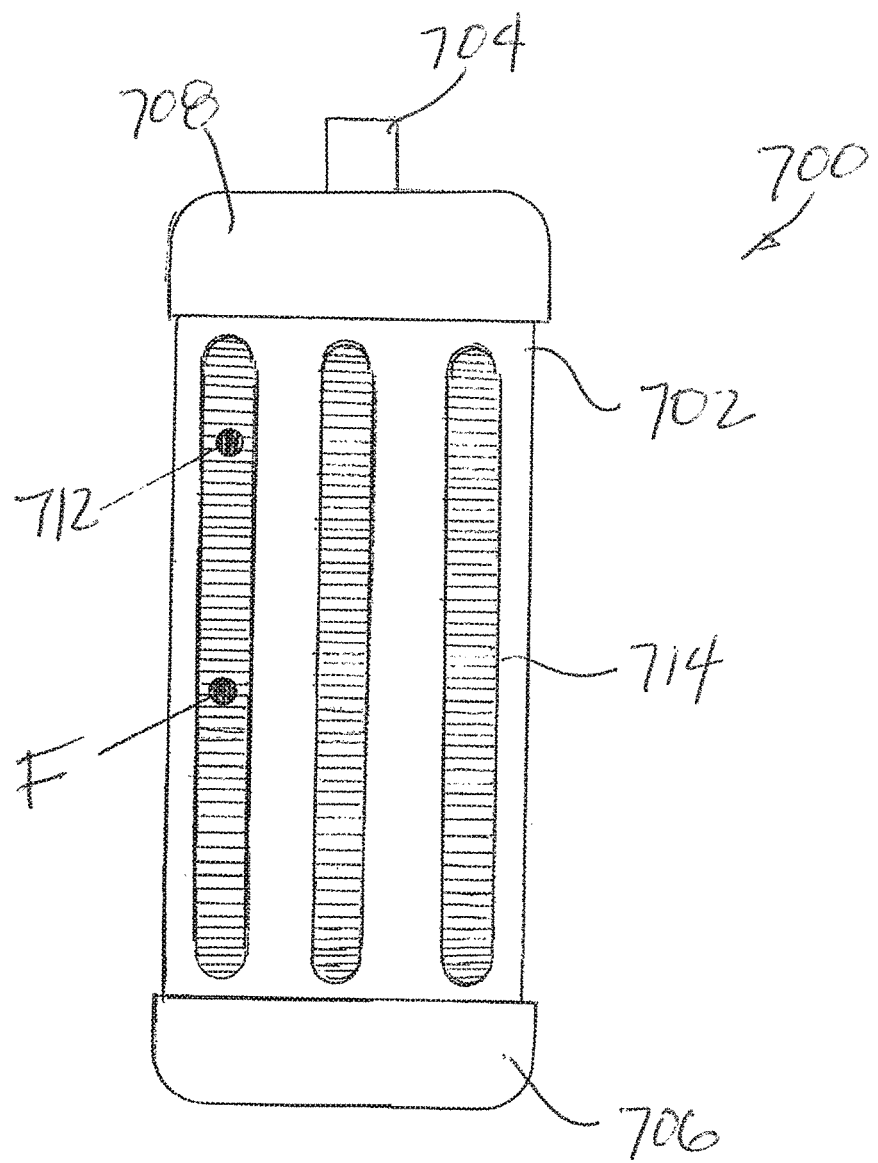
FIG. 4B is a schematic view of a sound suppressor in accordance with aspects of the present disclosure.

With reference to FIG. 4B, a muffler, silencer, or sound suppressor 700 is shown. The sound suppressor 700 has a housing 702 and an inlet 704. The inlet 704 can be connected to an outlet 504 or 506 of the second manifold 150. Two sound suppressors 700 can therefore be connected to the two outlet ports at the second manifold 150. The two sound suppressors 700 can suppress sound caused by discharge gas flowing out the outlet ports 504, 506.

In an example, the housing 702 has two end caps 706, 708, one at each end of the body of the housing. The inlet port 704 can form with one of the end caps 708. The housing and end caps can be made from a metal material, such as from aluminum, or can be molded from a durable plastic material. Internally of the housing, felt material or felt sheets 712 in combination with flow channels or baffles can be provided to slow down the discharge gas velocity and muffle the sound created by the fast moving gas. For example, exhaust gas can flow F through the felt sheets 712 through one of the open windows or channels 714 formed on the housing 702.

As previously discussed, the inlet port 502 receives compressed gas from the first manifold 140. An electro-mechanical motor 510 having a movable stem 512 is provided with the housing 500. The motor 510 can be activated when energized with 12 VDC, or on other power input depending on the motor selected. When activated, the stem 512 moves to direct flow out the first outlet port 152 or the second outlet port 154. The stem 512 is provided with multiple valve seats 520, 522, 524 to close one of several different ports 152, 154, 504, 506, but not the inlet port 502.

In an example, when the motor 510 is actuated, the stem 512 moves to block purge port 506 with valve seat 520. Purge port 506 is open to atmosphere. Valve seats 522 and 524 are also moved by the stem and block the flow header 530 in way that inlet compressed gas from port 502 can only flow out outlet port 152 to supply the first charging tower 170, for example, with compressed gas, such as compressed air at certain desired inlet pressure. When the stem 512 moves as noted, outlet port 154 is open or is in fluid communication with purge port 504, which is open to atmosphere. Thus, if the second charging tower 172 is pressurized higher than atmospheric pressure, pressure from the second charging tower 172 will flow out through the same line that connects to outlet port 154 to then flow out purge port 504.

When the motor 510 is actuated again, the stem can move in the opposite direction so that purge port 504 is blocked and outlet port 154 is open for fluid flow. Inlet gas flow from inlet port 502 is now directed through outlet port 154 only. In this actuated position, outlet port 152 is open or is in fluid communication with purge port 506. Thus, pressure from the first charging tower 170 connected to outlet port 152 can flow back through outlet port 152 and out purge port 506. The second manifold 150 can reverse direction again when actuated and repeat. In an example, the second manifold is available from Automatic Valve, P/N L2004AAWR-DA 2-3 way, valve electronic 12 Volt, as discussed elsewhere herein.

When the first tower 170 is open to the atmosphere via the second manifold 150, oxygen molecules trapped by the CMS absorbents inside the tower 170 as well as residual nitrogen molecules are released into the atmosphere. At the same time, as previously discussed, the upper chamber of the first tower 170 receives high concentration nitrogen molecules via the second charging tower 172 through the flow through 300, such as through an orifice located at point 298, of the outlet or output manifold 290. This stream may be referred to as a cleansing stream when incorporated. The cleansing stream allows the purging tank, which is understood to mean the tank that is being purged of trapped oxygen molecules, to quickly charge while the charging tank, which is understood to mean the tank that is receiving pressurized air to then separate the nitrogen molecules from the oxygen molecules, continues to generate nitrogen.

Again with reference to FIG. 5, nitrogen molecules discharging from the outlet port 172a of the second charging tower 172 flows into the discharge flow path 294 then through the second discharge channel 350 and through the spring loaded check valve 352. A stream is then directed through the outlet 324 and to the oxygen sensor 210 at the regulator and calibration system 200 to be checked against the set point before the nitrogen molecules are permitted to flow through the control valve 312 and out the outlet 322 and into the storage tank 340. The two spring loaded check valves 316, 352 are available from Supplier Specialty Manufacturing Co., P/N 5151090, 0-3000 psi brass valve.

In practice from an idle position, the two charging towers 170, 172 of the separator assembly 100 of the present disclosure may cycle about 2-5 times before the nitrogen purity is sufficiently high and meets the set point of about 85% or higher. This number of cycles can change based on a host of factors, such as whether the apparatus was previously purged, the size of the charging towers and CMS elements contained therein, and the compressed air quality used to feed the apparatus. Further, when the charging towers 170, 172 cycle between charging and purging, the time interval can be about 20 seconds to about 50 seconds. In other words, the second manifold 150 switches about every 20 seconds to about 50 seconds to direct compressed gas into the first charging tower or the second charging tower and the other one of the first charging tower and the second charging tower to purge to atmosphere.

Figure 6:
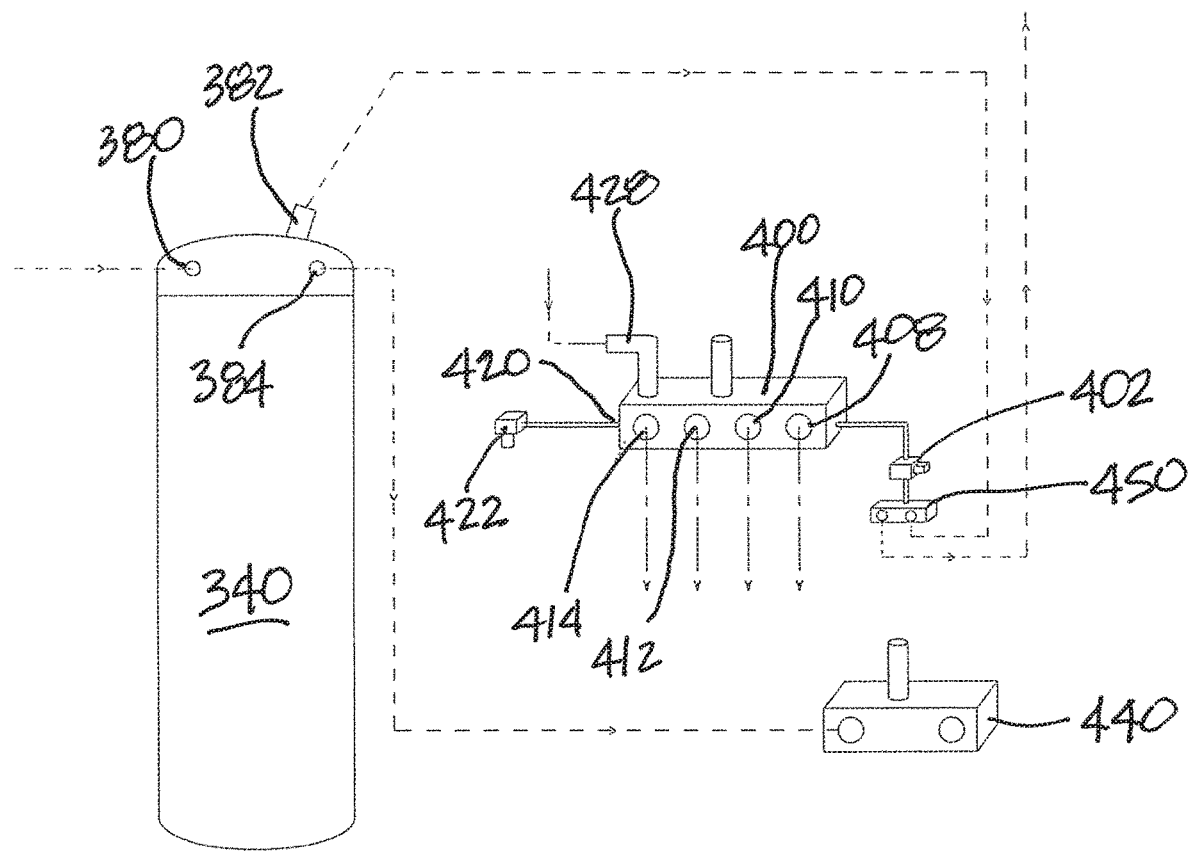
FIG. 6 is a schematic diagram depicting a storage tank and application manifolds of the present disclosure.

With reference now to FIG. 6 in addition to FIGS. 2 and 5, a storage tank 340 is shown. The tank 340, which is generally a cylinder, can be sized for pressure services of about 90 psi to 4,000 psi operating range and has a volumetric capacity of about 20 gallons to about 1,000 gallons. However, since inlet pressure to the separator system 100 is typically reduced to about 90 psi to 130 psi, the storage tank 340 will not likely see pressures at its upper rated range. Optionally, two or more tanks can be arranged in parallel or serially to increase the total system storage capacity. The storage tank 340 is configured to receive discharge nitrogen stream from the secondary outlet or output manifold 310 at the set nitrogen purity or higher.

The storage tank 340 may have multiple ports that can be used for inflow, outflow, pressure gauges, sensors, etc. As shown, three ports 380, 382, 384 are provided with the tank 340, one port 380 for inflow and two ports 382, 384 for outflow streams. In other examples, additional ports or fewer ports can be incorporated. For example, a pressure relief valve can be connected to one of the ports to relieve pressure inside the tank when the pressure exceeds the set point of the relief valve. In one example, port 382 is connected to an application manifold 400 via a control valve 402. A 1×2 lead manifold 450 can be incorporated upstream of the control valve 402, which can have one inflow port and two outflow ports. When incorporated, the gas stream from port 382 of the storage tank 340 can be routed to the inflow port of the lead manifold 450. The first outflow port can be routed to the RC system 200 to sense and read data regarding the gas stream, such as moisture content, nitrogen purity, oxygen content, temperature, pressure, etc. The second outflow port of the lead manifold 450 can be directed through the control valve 402 and then to the application manifold 400.

In an example, the application manifold 400 is provided with multiple controllable outlet ports, including dispensing ports 408, 410, 412, 414 for use to connect to four different items to be filled or dispensed into. In an example, each of the dispensing ports 408, 410, 412, 414 is connected to a control valve that can be individually controlled by the controller 160 to independently dispense or discharge. For example, each port of the four dispensing ports 408, 410, 412, 414 can be connected to a control valve and then a fill hose connected downstream of the control valve for use to fill automobile tires. The configuration allows for four tires to be filled simultaneously or separately, such as one at a time, two at a time, etc., as controlled by the controller directing whether to activate or not activate the corresponding control valve associated with each dispensing port. The configuration also allows for tires to be filled at the same or at different pressures, if desired. The final inflated pressure during the filling step can stop at the set point on the controller.

In some examples, the tires can be deflated, inflated, deflated, and inflated again to purge, fill, purge, and fill the tires with nitrogen gas. The number of inflation and deflection can be selected as desired.

An additional port 420 can be provided with the application manifold 400 and connected to a control valve 422. The control valve 422 at the additional port 420 can be used to release pressure from the application manifold 400 to depressurize the application manifold 400 before decoupling the one or more hoses connected to the dispensing ports 408, 410, 412, 414.

The application manifold 400 can further include a sampling port 428. The sampling port 428 can be directed to the RC system 200 to sense and read data regarding the gas stream, such as moisture content, nitrogen purity, oxygen content, temperature, pressure, etc. Alternatively or additionally, gas stream from the sampling port 428 can be routed directly to the controller to read pressure or other readings not involving nitrogen, humidity, moisture, or oxygen.

In some embodiments, additional application manifolds 440, such as two or more application manifolds, for example three additional application manifolds or more, maybe added and connected serially to other application manifolds or directly to different ports located on the nitrogen tank 340. Each additional application manifolds 440 can be connected downstream of a lead manifold, similar to lead manifold 450 for the first application manifold 400.

For agricultural applications, the nitrogen gas generated by the gas separator assembly 100 can be used for or as fertilizer. In an example, discharge nitrogen gas from the storage tank 340 can be routed to a manifold, which can be connected to a control valve and to a controller. A flow manifold can be connected downstream of the gas manifold to disperse the nitrogen gas to different paths to fertilize plants, trees, shrubs, or combinations thereof. The feed to the plants, trees, and/or shrubs from the gas separator assembly can be nitrogen gas only or the gas stream can be mixed or combined with water to both fertilize and water the plants, trees, and/or shrubs. The system can be on a timer to discharge the nitrogen gas at set time intervals and for set time durations, such as every 3 hours for 5 to 15 minutes, every other day, every day, several times per day, etc. Various watering devices can be connected to the gas separator assembly to both water and fertilize. For example, mixers, eductors control valves, tees, dispersed nozzles, drip system or lines, sprinklers, etc.

A method of making and of using a gas separator assembly and components thereof are within the scope of the present disclosure.

Although limited embodiments of the separator assembly and its components have been specifically described and illustrated herein, many modifications and variations will be apparent to those skilled in the art. For example, the various sensors and control valves are not limited to those exact models disclosed as equivalent and/or alternative means and suppliers can be used. Accordingly, it is to be understood that the separator assembly and components constructed according to principles of the disclosed devices, systems, and methods may be embodied other than as specifically described herein. The disclosure is also defined in the following claims.

What is claimed is:

1. A method of manufacturing a gas separator comprising:
providing a first charging tower comprising a body with an upper end and a lower end defining an interior;
filling the first charging tower with a bed of carbon molecular sieve elements and packing the bed of carbon molecular sieve elements by shaking, vibrating, moving, imparting an impulse, or combinations thereof to the body to produce a first packed bed of carbon molecular sieve elements;
performing at least one re-pour step to add carbon molecular sieve elements to the first packed bed of carbon molecular sieve elements to produce a first re-pour bed of carbon molecular sieve elements and packing the first re-pour bed of carbon molecular sieve elements by shaking, vibrating, moving, imparting an impulse, or combinations thereof to the body to produce a second packed bed of carbon molecular sieve elements;
providing a second charging tower comprising a body with an upper end and a lower end and a bed of carbon molecular sieve elements;
capping the upper end of the first charging tower and the upper end of the second charging tower with an outlet manifold having a unitarily formed body,
wherein a first outlet port in fluid communication with the first charging tower and a second outlet port in fluid communication with the second charging tower are located in the unitarily formed body of the outlet manifold; and
wherein a bypass header is attached to an exterior of the outlet manifold and connected to the first outlet port and the second outlet port.

2. The method of claim 1, further comprising an orifice mounted to the bypass header and in fluid communication with both the first outlet port and the second outlet port.

3. The method of claim 2, further comprising a secondary outlet manifold attached to the exterior of the outlet manifold and spaced from the bypass header, said secondary outlet manifold comprising at least one flow port.

4. The method of claim 2, further comprising connecting a flow line to direct discharge flow from the first charging tower and the second charging tower to a regulator and control system comprising a manifold, a pressure step-down regulator, and a gas sensor to sense contents from the first charging tower and the second charging tower.

5. The method of claim 4, further comprising connecting an air supply line to a manifold and connecting a first inlet line from the manifold to the first charging tower and a second inlet line from the manifold to the second charging tower, and wherein air flow to either the first inlet line or the second inlet line depends on data from the gas sensor.

* * * * *